(12) United States Patent
Mattern et al.

(10) Patent No.: US 9,289,897 B2
(45) Date of Patent: Mar. 22, 2016

(54) APPARATUS FOR THE AUTOMATED REMOVAL OF WORKPIECES ARRANGED IN A CONTAINER

(71) Applicant: Liebherr-Verzahntechnik GmbH, Kempten (DE)

(72) Inventors: Thomas Mattern, Rieden (DE); David Haenschke, Altusried (DE); Bernhard Riedmiller, Wertach (DE); Alois Mundt, Kempten (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 116 days.

(21) Appl. No.: 13/929,637

(22) Filed: Jun. 27, 2013

(65) Prior Publication Data

US 2014/0017048 A1    Jan. 16, 2014

(30) Foreign Application Priority Data

Jun. 29, 2012  (DE) .......................... 10 2012 013 030
Jun. 18, 2013  (EP) ...................................... 13003101

(51) Int. Cl.
  *B25J 9/00*    (2006.01)
  *B25J 19/02*   (2006.01)
  (Continued)

(52) U.S. Cl.
  CPC .............. *B25J 9/0084* (2013.01); *B25J 9/0093* (2013.01); *B25J 9/0096* (2013.01); *B25J 9/1612* (2013.01); *B25J 19/023* (2013.01); *B65G 47/1478* (2013.01); *G06T 1/0014* (2013.01); *B65G 2203/041* (2013.01); *G05B 2219/39508* (2013.01)

(58) Field of Classification Search
  CPC ...... B25J 9/1612; B25J 9/0093; B25J 9/0096; B25J 9/0084; B25J 19/023; B65G 47/1478; G06T 1/0014

See application file for complete search history.

(56) References Cited

U.S. PATENT DOCUMENTS

| | | | | |
|---|---|---|---|---|
| 4,017,721 A | * | 4/1977 | Michaud | ........................ 700/259 |
| 4,402,053 A | * | 8/1983 | Kelley et al. | .................. 700/259 |

(Continued)

FOREIGN PATENT DOCUMENTS

| | | |
|---|---|---|
| DE | 2749603 A1 | 9/1979 |
| DE | 102004021000 B4 | 3/2006 |

(Continued)

OTHER PUBLICATIONS

Mattern, Thomas, "Apparatus for the Automated Detection and Removal of Workpieces," U.S. Appl. No. 13/929,643, filed Jun. 27, 2013, 68 pages.

(Continued)

*Primary Examiner* — Kaitlin Joerger
(74) *Attorney, Agent, or Firm* — Alleman Hall McCoy Russell & Tuttle LLP

(57) ABSTRACT

An apparatus for the automated removal of workpieces arranged in a container comprising a first object recognition device for detecting the workpieces and a first gripper for picking and removing the workpieces from the container; and a control for evaluating the data of the first object recognition device, for track planning and for controlling the first gripper; wherein an intermediate station on which the first gripper places the workpiece after the removal from the container; and a positioning apparatus which positions the workpieces more accurately starting from the intermediate station and/or singularizes them.

25 Claims, 25 Drawing Sheets

(51) Int. Cl.
*B65G 47/14* (2006.01)
*G06T 1/00* (2006.01)
*B25J 9/16* (2006.01)

(56) References Cited

U.S. PATENT DOCUMENTS

| | | | | |
|---|---|---|---|---|
| 4,412,293 | A | * 10/1983 | Kelley et al. | 700/259 |
| 5,370,216 | A | * 12/1994 | Tsuruyama et al. | 198/395 |
| 6,056,108 | A | 5/2000 | Buchi et al. | |
| 2008/0253612 | A1 | 10/2008 | Reyier et al. | |
| 2008/0283370 | A1* | 11/2008 | Monti | 198/867.01 |
| 2014/0147240 | A1* | 5/2014 | Noda et al. | 414/751.1 |

FOREIGN PATENT DOCUMENTS

| | | | | |
|---|---|---|---|---|
| DE | 102008025857 | * | 3/2009 | B25J 19/02 |
| DE | 102009021538 | A1 | 11/2010 | |
| DE | 102010022988 | A1 | 1/2011 | |
| EP | 0139307 | A3 | 5/1985 | |
| EP | 2364823 | A2 * | 9/2011 | |
| EP | 2578365 | A2 * | 9/2012 | B25J 9/16 |
| JP | 2010005769 | A | 1/2010 | |
| JP | 2011000685 | A | 1/2011 | |
| WO | 2010024794 | A1 | 3/2010 | |

OTHER PUBLICATIONS

Mattern, Thomas, "Apparatus for the Automated Handling of Workpieces," U.S. Appl. No. 13/929,647, filed Jun. 27, 2013, 68 pages.

Mattern, Thomas, "Apparatus for the Automated Handling of Workpieces," U.S. Appl. No. 13/929,652, filed Jun. 27, 2013, 76 pages.

* cited by examiner

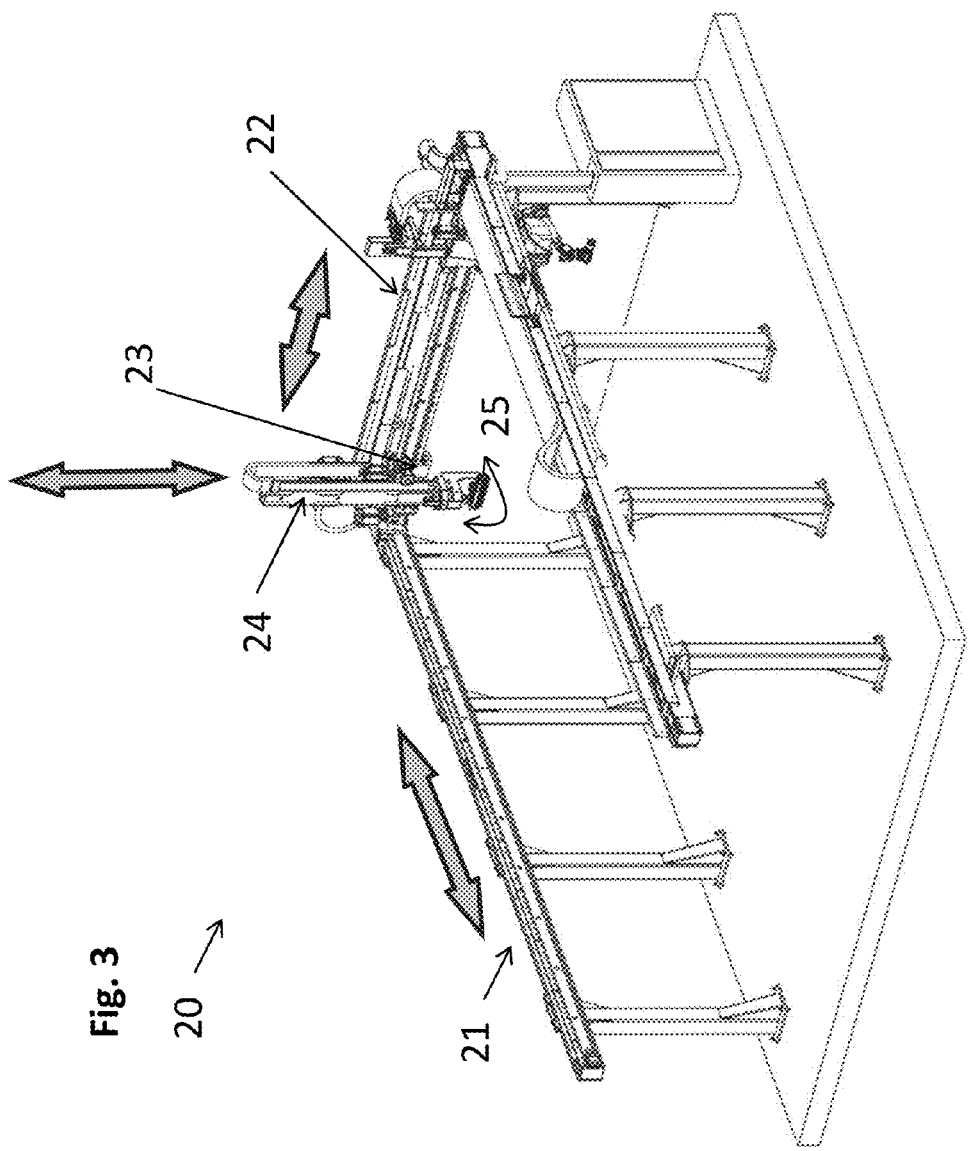

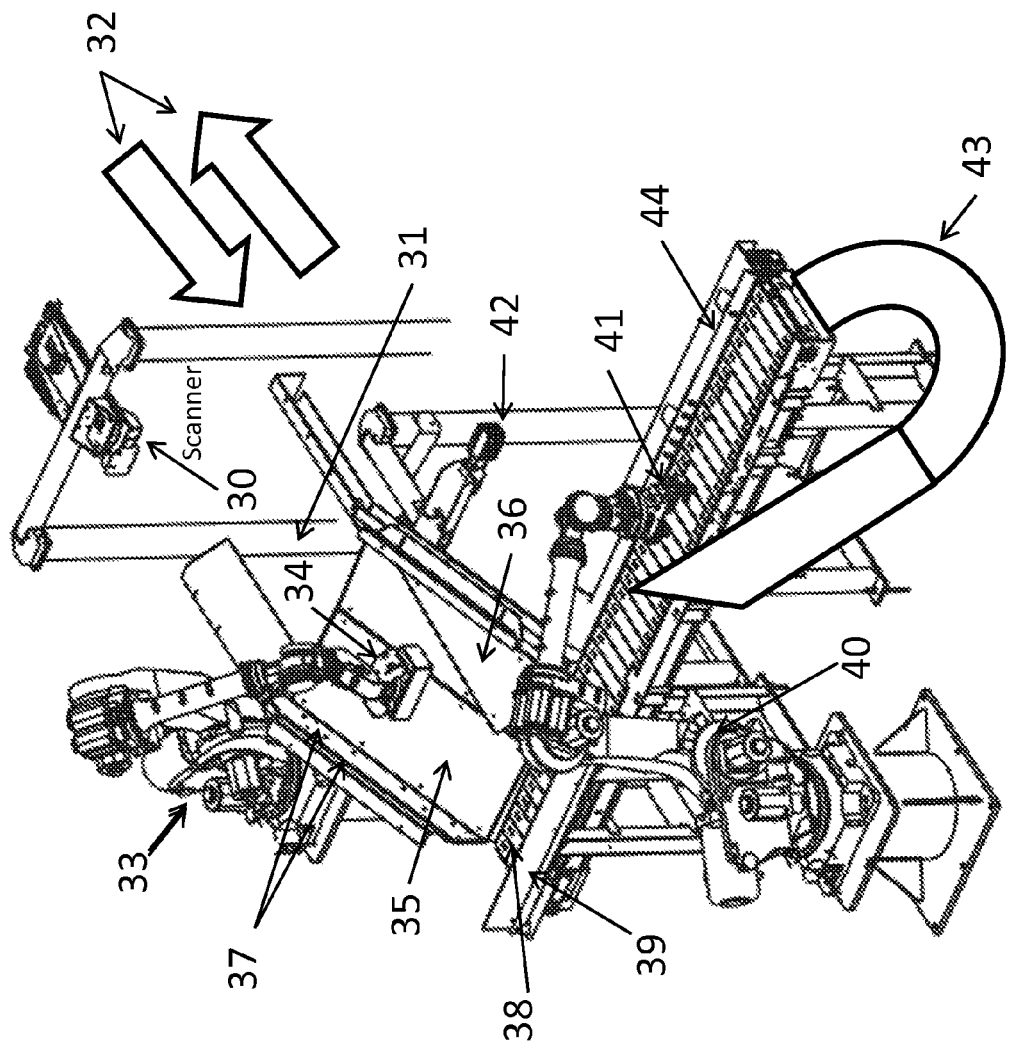

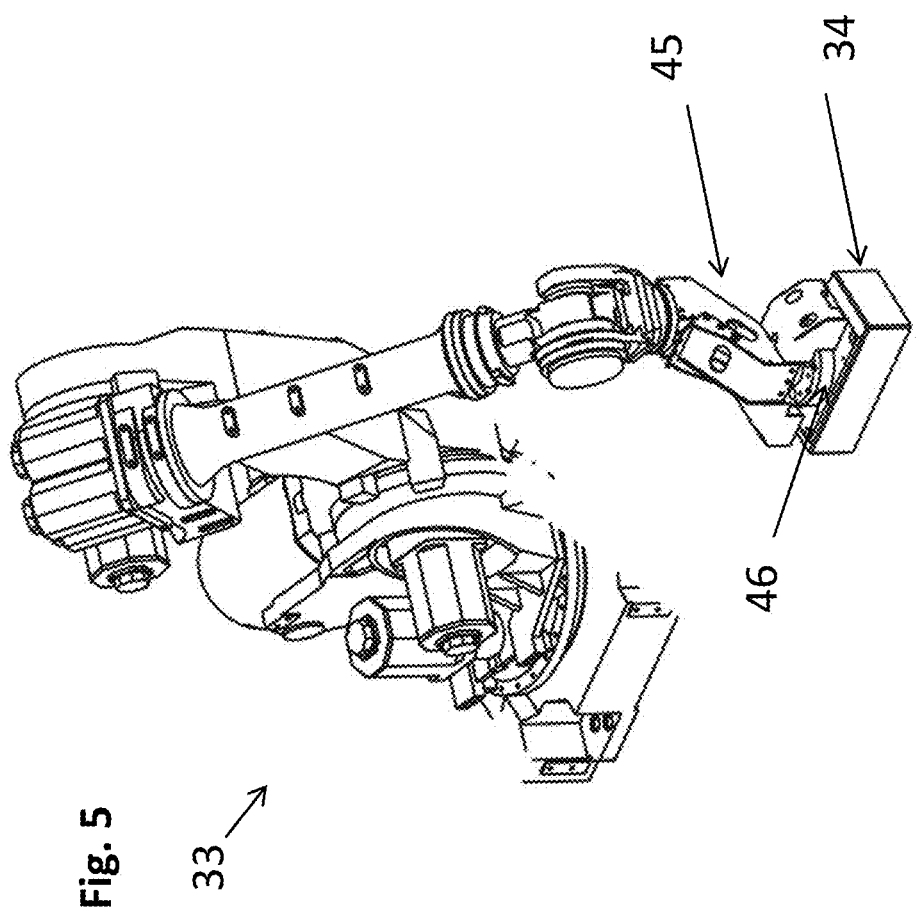

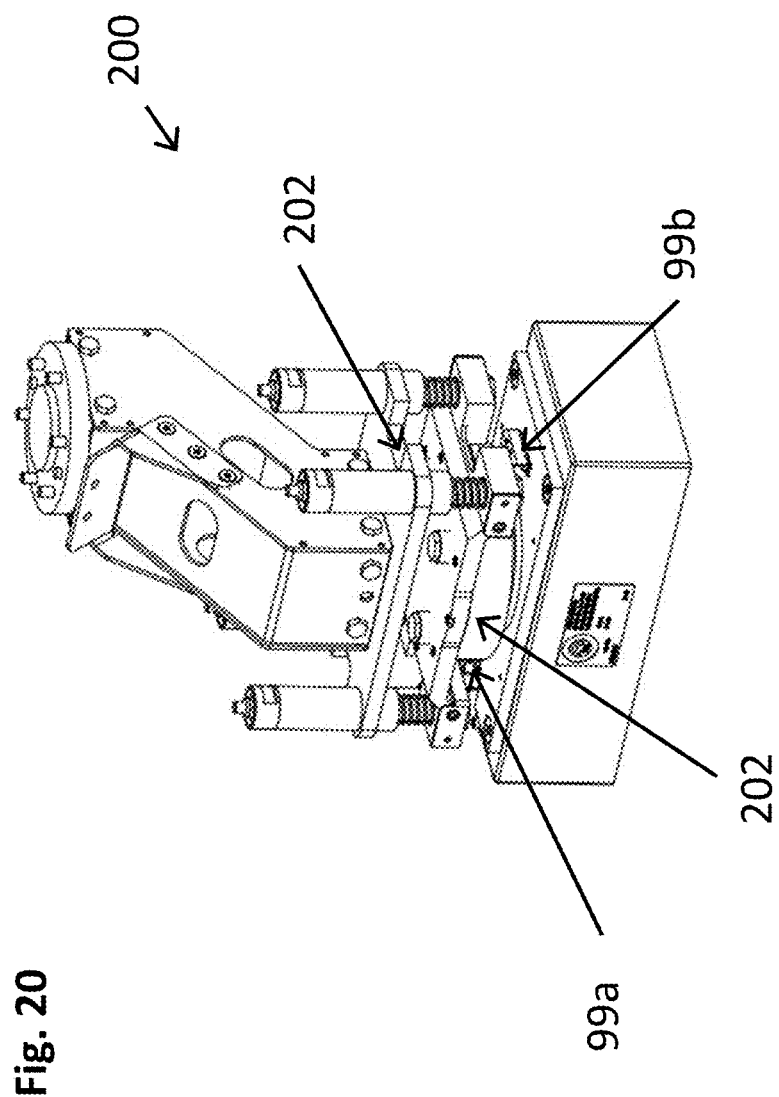

APPARATUS FOR THE AUTOMATED REMOVAL OF WORKPIECES ARRANGED IN A CONTAINER

CROSS-REFERENCE TO RELATED APPLICATIONS

This application claims priority to German Patent Application No. 10 2012 013 030.9, entitled "Apparatus for the Automated Removal of Workpieces Arranged in a Container," filed Jun. 29, 2012, and also claims priority to European Patent Application No. 13 003 101.6, entitled "Apparatus for the Automated Removal of Workpieces Arranged in a Container," filed Jun. 18, 2013, both of which are hereby incorporated by reference in their entirety for all purposes.

TECHINICAL FIELD

The present invention relates to an apparatus for the automated removal of workpieces arranged in a container, comprising a first object recognition device for detecting the workpieces and a first gripper for picking and removing the workpieces from the container and a control for evaluating the data of the first object recognition device, for track planning and for controlling the first gripper. The control can in this respect in particular comprise an evaluation device for evaluating the data, a track planning module for track planning and a control unit for controlling the gripper.

BACKGROUND AND SUMMARY

Such systems in which a container having workpieces (usually arranged randomly) is emptied in an automated fashion, for example by use of a robot, have become known under the name "bin picking" In this process, the workpieces arranged in the container are detected by the object recognition device and the gripper is controlled using the data on the detected workpieces such that it picks the workpieces and removes them individually from the container.

Most apparatus for "bin picking", however, have previously not moved past an experimental stage since a variety of problems have to be overcome in the process security, process speed and accuracy.

It is therefore the object of the present invention to provide an apparatus for the automated removal of workpieces arranged in a container which has improved properties with respect to process security, speed and/or accuracy.

This object is achieved in accordance with the invention by an apparatus for the automated removal of workpieces arranged in a container, comprising a first object recognition device for detecting the workpieces and a first gripper for picking and removing the workpieces from the container; and a control for evaluating the data of the first object recognition device, for path planning and for controlling the first gripper, characterized by an intermediate station on which the first gripper places the workpieces after the removal from the container and a positioning apparatus which positions the work pieces more accurately and/or singularizes the workpieces starting from the intermediate station.

Preferred embodiments of the invention form the subject of the dependent claims.

The present invention relates to an apparatus for the automated removal of workpieces arranged in a container, comprising a first object recognition device for detecting the workpieces and a first gripper for picking and removing the workpieces from the container and a control for evaluating the data of the first object recognition device, for track planning and for controlling the first gripper. The control can in this respect in particular comprise an evaluation device for evaluating the data, a track planning module for track planning and a control unit for controlling the gripper. In accordance with the invention, an intermediate station is provided in this respect on which the first gripper places the workpieces after the removal from the container and a positioning apparatus is provided which positions the work pieces more accurately and/or singularizes the workpieces starting from the intermediate station.

The first gripper does not yet have to pick or place the workpieces with the final accuracy required for the further processing of the workpieces thanks to the use of an intermediate station in accordance with the invention, which substantially simplifies the emptying of the container and increases process times. Furthermore, on an emptying of the workpieces from the container, it also does not have to be ensured that the workpieces are singularized completely and reliably. The intermediate station is rather used in accordance with the invention to position the workpieces more accurately and optionally finally to singularize them.

The apparatus in accordance with the invention can in this respect in particular serve the removal of workpieces arranged randomly in the container since the position of the workpieces can be determined by a suitable object recognition device and therefore does not have to be known in advance. The apparatus can naturally, however, also be used when the workpieces are already present with a certain order in the container.

The apparatus in accordance with the invention can in this respect in particular serve the automated arrangement of the workpieces at a target receiver, with the control controlling the positioning apparatus such that the workpieces are arranged, starting from the intermediate station at the target receiver with a greater accuracy than they were placed on the intermediate station.

The inventors of the present invention have recognized in this respect that the process security, accuracy and speed required in industrial applications can only be reached by the use of such an intermediate station.

In accordance with the invention, in this respect, any desired gripper, in particular a mechanical, magnetic and/or pneumatic gripper, can be used as the first gripper for picking the workpieces in the container.

A magnetic and/or pneumatic gripper is, however, particularly preferably used as the first gripper for picking the workpiece in the container. Such magnetic and/or pneumatic grippers can in this respect in particular also be used in the handling of workpieces having a position-orientated gripping zone and/or an asymmetrical contour as well as with workpieces without any specific gripping zone such as with metal sheets. They can, however, naturally also be used with symmetrical workpieces, for example with rotationally symmetrical workpieces.

Magnetic and/or pneumatic grippers have the advantage that they have to be positioned less exactly toward the workpiece in order to be able to pick it. Such grippers in particular also allow a certain offset between the workpiece and the gripper or they allow picking at a plurality of different points of a workpiece.

In this respect, a magnetic gripper is particularly preferably used for picking the workpiece from the container.

The gripper in accordance with the invention can furthermore be arranged cropped at the end member of a gripping arm. It is possible by the cropped configuration of the gripper also to use it directly next to a side wall of the container in the interior of the container for picking workpieces. It is thus in particular avoided that interfering edges further up at the gripping arm prevent a moving of the magnetic gripper directly to a wall region of the container.

In accordance with the invention, any desired system which allows the identification of the workpieces and the selection of a workpiece suitable for picking can be used as an object recognition device for detecting the workpieces.

If the position of the workpieces in the container is known in advance, for example because they are arranged in order in the container, the object recognition device can optionally also only take place using such already known positional data.

The detection of the workpieces, however, advantageously comprises a data logging by a measurement process. An identification of the individual workpieces in the detection zone from which a workpiece suitable for picking is selected then takes place by evaluation of the data. The movement of the gripper or of the gripping arm moving it is planned on the basis of the positional data of this workpiece. In this respect, a collision check can be carried out so that a movement routine is selected in which the gripper or the gripping arm does not collide with interfering edges such as the other workpieces and/or the side walls of the container. The gripper or the gripping arm is then controlled using the data thus calculated.

In this respect, in particular optical sensors are used as the object recognition device, with in particular laser sensors and/or image sensors being able to be used. The sensors can in this respect work two-dimensionally, two-and-half-dimensionally and three-dimensionally. A 3D laser scanner is particularly preferably used in this respect.

The first object recognition device for detecting the workpieces in the container is in this respect preferably arranged in its measurement position above the container.

In the selection of the workpiece to be picked, it can in particular be detected in this respect whether a workpiece was identified which can be picked with a predefined first relative position between the workpiece and the gripper.

Such a first relative position can in particular represent an ideal picking position between the workpiece and the gripper which comprises the fact with a magnetic gripper, for example, that the magnetic surface of the gripper overlaps ideally with the workpiece.

However, the case can arise with parts not lying on one another in order than none of the workpieces present in the container can be picked with such a first relative position. In accordance with the invention, the control can in this case select a workpiece which is picked with a second picking position, for example a not ideal picking position. With a magnetic gripper, for example, a certain offset can be allowed in this respect between the ideal magnetic gripping surface and the workpiece. A picking position rotated by an angle with respect to the ideal magnetic picking position can likewise be considered as an alternative picking position with the magnetic gripper, for example having an angle offset of 90°. Alternatively, or also when this is not possible, a picking can be attempted at the highest point of the workpiece, for example. A plurality of alternative picking positions can in particular be provided which are used in the selection of the workpiece to be picked.

Provision can alternatively or additionally be made that the gripper is controlled in accordance with the invention such that for the case it cannot pick up a workpiece with a first position calculated for picking, it repeats the picking with a second, changed position. This is only possible with mechanical grippers if the workpiece provides a plurality of gripping zones. With magnetic and/or pneumatic grippers, in contrast, picking can also takes place more easily with a certain offset from an ideal picking position.

In an advantageous embodiment of the present invention, the positioning apparatus also comprises a gripper for picking the workpieces off from the intermediate station.

In a first variant, this gripper can in the respect be the first gripper which is thus used both for removing the workpieces from the container and for the more exact positioning of the workpiece starting from the intermediate station.

In a first preferred variant, the gripper of the positioning apparatus is, however, a second, separate gripper.

In this respect, in turn, any desired gripper can be used as the second gripper, in particular a mechanical, magnetic and/or pneumatic gripper. The second gripper in this respect preferably has a different design than the first gripper.

The present invention thus comprises all combinations of first and second grippers and in particular the combinations of magnetic/mechanical, mechanical/mechanical, pneumatic/mechanical, mechanical/pneumatic, pneumatic/pneumatic and magnetic/pneumatic.

The second gripper of the positioning apparatus is, however, particularly advantageously a mechanical gripper. Such a mechanical gripper has a higher accuracy in the picking and positioning of the workpiece, but also requires a more accurate delivery to the workpiece. In this respect, such a mechanical gripper having sufficient process security and accuracy can be used through the intermediate station in accordance with the invention on which the workpieces are already presingularized and prepositioned.

The design of the mechanical gripper in this respect accordingly depends on the workpieces to be picked. For example, the mechanical gripper can be a finger gripper, in particular a multifinger gripper.

It is furthermore conceivable to use a magnetic gripper having a plurality of magnetic gripping zones, which magnetic gripper accordingly allows a more accurate picking The gripping zones are in this respect advantageously matched to the workpiece to be picked.

The present invention in this respect allows a one hundred percent emptying the container in a preferred variant. This is in particular achieved by the use of an intermediate station in accordance with the invention and/or by the use of a magnetic and/or pneumatic gripper for picking the workpieces in the container.

The present invention thus ensures that all the workpieces present in a container can actually also be removed, which would not be possible in many cases with a direct arrangement of the workpieces at a target receiver and/or on the use of a mechanical gripper for removing the workpieces from the container.

In this respect, after the removal of a workpiece identified as the last workpiece in the container by the controller, a detection of workpieces in the container can advantageously take place again to ensure that the container has also actually been completely emptied. A channeling out of the container advantageously only takes place when no workpieces were able to be identified in this detection.

The present invention preferably comprises a second object recognition device for detecting the workpieces on the intermediate station. The workpieces placed on the intermediate station are thus detected again in accordance with the invention and can thus be picked and/or singularized with increased accuracy by the positioning apparatus, and in particular by the gripper of the positioning apparatus.

In this respect, an object recognition device can be used as an object recognition device for detecting the workpieces such as has already been described above with respect to the first object recognition device for detecting the workpieces in the container.

The evaluation of the data, identification and selection of the workpieces, the track planning and the control of the gripper of the positioning apparatus can also take place in a similar manner as has been represented above with respect to the corresponding steps on picking from the container.

Furthermore, a check can take place in the control whether the workpieces are the workpieces desired for the further processing or a workpiece arranged in the container by error. A comparison of workpiece data which were determined by evaluating the data of the object recognition device can in particular take place in this respect with predefined demands.

If an erroneous workpiece is recognized, the control sorts it out by a corresponding control of the gripper.

The sorting out of workpieces in this respect advantageously takes place on the intermediate station, in particular by evaluating the data of the second object recognition device and by controlling the second gripper and/or via a channeling out of the transport belt, for example when the gripper cannot pick the erroneous part.

Provision can furthermore be made that the detection of the workpieces on the intermediate station takes place with a higher accuracy than the detection of the workpieces in the container, for example with a higher resolution.

The second object recognition device for detecting the workpieces on the intermediate station is in this respect advantageously arranged in or above a removal region of the intermediate station. The second object recognition device can in particular thus detect the workpieces which should be picked by the positioning apparatus in the removal region of the intermediate station.

As already initially explained, it is not necessary through the use of the intermediate station to position the workpieces exactly on the placing on the intermediate station since the further positioning takes place by the positioning apparatus. The work pieces can in this respect in particular be randomly placed on the intermediate station.

The workpieces can in this respect in particular be arranged randomly on the intermediate station and can be picked by the positioning apparatus and then positioned and/or singularized.

Provision can be made in this respect that the control controls the first gripper for placing the workpieces on the intermediate station such that the workpieces fall onto a placing region from a certain height. This procedure has a plurality of advantages:

On the one hand, it is thus prevented that the gripper with the workpiece collides with the intermediate station on the placing of the workpieces since the workpieces still have a certain distance from the intermediate station on being dropped. The position of the workpiece at the gripper furthermore does not have to be known. In addition, an exact positioning can be dispensed with, which increases the speed. This procedure furthermore has the advantage with workpieces which can catch with one another that they release from one another when falling onto the placing region. In addition, this dropping allows a separation of a plurality of workpieces picked up simultaneously.

The dropping of the workpieces has special advantages in this respect when a magnetic and/or pneumatic gripper is used for removing the workpieces from the container. In this case, the position of the workpiece at the gripper is namely not necessarily clearly defined so that a positioning of the workpieces on the intermediate station would hardly be possible. Furthermore, in particular with magnetic grippers, it can never be precluded that a plurality of workpieces are picked up so that the dropping results in a further singularization.

The placing region of the intermediate zone advantageously comprises a slanted plane in this respect. The workpieces are in particular dropped onto the slanted plane in this respect. The slanted plane in this respect serves the singularization and/or preorientation of the workpieces and/or the further transport of the workpieces. The slanted plane in this respect in particular serves as a slide for the workpieces.

The placing region configured as the slanted plane in this respect preferably has lateral abutment regions which guide the workpieces laterally. The abutment regions in this respect preferably narrow the slanted plane toward the bottom so that the workpieces are dropped in a relatively large region in the lateral direction and are nevertheless led through the narrowing abutment regions to a further transport region shorter in the lateral direction.

A height sensor is preferably provided for recognizing the distance of a workpiece arranged at the gripper from the placing region in the vertical direction. The position of the workpiece at the gripper hereby does not have to be known to drop the workpiece from a predefined height. This height can rather be recognized by the height sensor. The height sensor in this respect in particular serves the recognition of the height of the workpiece above the slanted plane.

In a preferred embodiment, a light barrier arrangement arranged laterally at the placing region is used as a vertical sensor. A workpiece can in this respect in particular be dropped when it reaches the region monitored by the light barrier arrangement.

The first gripper is thus advantageously controlled so that it moves a workpiece removed from the container over the placing region of the intermediate station and lowers it there until the height sensor recognizes a predefined distance between the workpiece and the placing region. The workpiece is thereupon dropped.

In a particularly simple embodiment of the present invention, the placing region and the removal region of the intermediate station can be identical. The intermediate station in this case, for example, only comprises a surface on which the workpieces are placed and from which they are picked up again.

Provision can be made in a further embodiment that the placing region has, as described above, a slanted plane on which the workpieces slide up to the removal region.

The intermediate station, however, preferably comprises a transport device for the further transport of the workpieces away from a placing region. The transport device can have a drive in this respect. A transport belt can in particular be used in this respect.

Since the workpieces can be randomly arranged on the transport belt, the transport device advantageously has no receivers for the workpieces. The workpieces can in this respect in particular be randomly arranged on a transport surface, for example on a transport surface formed by a transport belt.

The transport device advantageously transports the workpieces from the placing region to a removal region in which the workpieces are picked by a gripper of the positioning apparatus and are taken from the intermediate station. The workpieces are advantageously detected by a second object recognition device before or in this removal region.

In this respect, the detection of the workpieces and/or the taking away of the workpieces advantageously takes place while the workpieces are located on the transport device. In this respect, the transport device is preferably stopped to detect and/or take off the workpieces. If a further workpiece is taken off, the transport device is moved on until the next workpiece was moved into the detection and/or removal region.

In this respect, data of the second object recognition device and/or a light barrier is/are used for controlling the transport belt.

In accordance with the invention, the workpieces falling onto the slanted plane slide to a first end of the transport device from where they are transported on the transport device to a removal region.

In accordance with the invention, the transport device can be equipped with a mechanical reorientation device which at least partly changes the position of workpieces on the transport from the placing region to the removal region and/or carries out a rough prepositioning.

Such a reorientation device is always of advantage when the workpieces cannot be picked by the positioning apparatus in certain positions. This can be the case, for example, when the workpieces come to lie on the transport apparatus on their narrow side, but can only be picked when they lie on their broad side. In this case, the reorientation device can be configured so that it throws over workpieces lying on their narrow sides.

In particular a flap and/or a bar can be provided as a reorientation device, said bar advantageously running transversely to the transport direction over the transport device. The flap or the bar is in this respect in particular arranged at a predefined height above the transport belt.

The intermediate placement element can thus in particular have a placing region and a removal region as well as a transport device which transports the workpieces from the placing region to the removal region. An object detection device can furthermore be arranged above the removal region. The transport from the loading side to the unloading side can in this respect be implemented in a variety of manners.

It is conceivable, for example, to use a transport device without a drive in which transport device the workpieces move from the placing region to the removal region solely due to gravity. A slanted plane can in particular be used in this respect on which the workpieces slide down.

The transport device, however, as described above, preferably has a drive. In this respect, different configurations are conceivable:

The drive can thus take place in linear manner via a transport belt, for example, or e.g. via a pusher, a shuttle or a slide. A motor or a linear drive such as a pneumatic cylinder can be used as the drive in this respect.

A circular embodiment of the transport device is furthermore conceivable. For example, a turntable can thus be provided on which the workpieces are placed down at one side and are transported to the other side by rotating the table. In this respect, e.g. a round, segmented table and/or a circular store can be used. It is likewise conceivable to use a loop or a circular transport belt.

The transport can furthermore also take place in the vertical direction, in particular between a plurality of planes lying above one another. In this respect, the transport can take place from top to bottom and/or from bottom to top.

It is furthermore conceivable to use a combination of the above-named possibilities as the transport device.

The position of the workpiece is preferably changed during the transport to increase the removal accuracy (place down inaccurately, remove accurately). This can take place, for example, by the above-described reorientation device, in particular by end abutments, guide rails with a chamfer, spring mechanisms, etc. The intermediate station can furthermore also be used as a transfer picking site.

In a possible embodiment, the transport device can in this respect be configured as a transport surface which is traveled via a linear drive such as a transport cylinder from the placing region to the removal region and back again. In this respect, two such transport surfaces are particularly preferably provided so that an empty transport surface is always available for loading in the placing region and a filled transport surface in the removal region for unloading. The system can hereby work without waiting times. The linear drives of the two transport surfaces can in this respect in particular be arranged in parallel with one another.

In accordance with the invention, the intermediate station can be equipped with an occupation sensor to detect the occupation of the placing region and/or of the transport device and/or of the removal region. In this respect, in particular a light barrier can be used as the occupation sensor, with the light barrier advantageously being arranged to the side at the placing region and/or at the transport device and/or at the removal region. The light barrier is in this respect in particular arranged at a certain height and recognizes whether a plurality of workpieces are stacked above one another on the transport device.

The control is in this respect advantageously configured so that the placing down of workpieces on the intermediate station is stopped when too high an occupation is recognized. The occupation sensor in this respect is in particular used to monitor the occupation of that part of the transport device into which the workpieces slide from the placement region. If this region is loaded too much, the placing down of workpieces onto the intermediate station is stopped until there is again sufficient room in this region by the removal of workpieces by the positioning apparatus and the further movement of the transport device.

In accordance with the invention, the first gripper and/or the second gripper can be moved via automatically controlled adjustment axes of a gripping arm.

In a first embodiment variant, the first gripper and the second gripper can in this respect be arranged at a common gripping arm and can be moved via it.

The first and second grippers are, however, preferably arranged at separate gripping arms and can thus be moved independently of one another.

The gripping arm or gripping arms can in particular be the robot arm of a six-axial industrial robot. Alternatively, however, a gripping arm arranged at an areal or linear portal can also be used which optionally has at least one further axis of rotation.

Furthermore, the container with the workpieces could also be moved to generate at least some of the relative movement between the workpiece and the first gripper.

The present invention furthermore includes a method for the automatic removal of workpieces arranged in a container. The method in this respect can include the steps detecting the workpieces;
picking at least one workpiece using a first gripper; and
removing the workpiece from the container.

Provision is made in accordance with the invention that, after the removal from the container, the workpieces are placed onto an intermediate station from where the workpieces are positioned more accurately and/or are singularized by at least one further positioning step.

The method in accordance with the invention in this respect preferably takes place as was already described above with regard to the apparatus. The method in accordance with the invention particularly preferably takes place in this respect using an apparatus as was presented above.

The present invention furthermore comprises a computer program for carrying out a method in accordance with the invention. The computer program in particular comprises commands which implement a method in accordance with the invention on an apparatus for the automated removal of workpieces randomly arranged in a container. The computer program in accordance with the invention in particular serves the implementation of a control for an apparatus as described above in this respect.

All the steps in the handling of the workpieces advantageously take place by the method in accordance with the invention and/or by the apparatus in accordance with the invention in a fully automated manner and without a user intervention being necessary.

BRIEF DESCRIPTION OF THE FIGURES

The subject of the present invention will now be described in more detail with reference to embodiments and to drawings.

FIG. 3 shows a second embodiment of an apparatus which can be used for moving a gripper in accordance with the invention.

FIG. 4a shows first embodiment of an apparatus in accordance with the invention for the automated removal of workpieces randomly arranged in a container.

FIG. 4b shows an alternative embodiment of a transport path as can be used on the intermediate station in the embodiment shown in FIG. 4a.

FIG. 5 shows a first gripper of the embodiment shown in FIG. 4a.

FIG. 7 shows a second gripper of the embodiment shown in FIG. 4a.

FIG. 8 shows an embodiment of a travelable object recognition device as can be used in the embodiment shown in FIG. 4a.

FIG. 20 shows a second embodiment of a compensation unit in accordance with the Invention.

DETAILED DECRIPTION

Embodiments of apparatus for the automated handling of workpieces will be presented in the following in which the present invention is used.

The individual embodiments in this respect in particular serve the fully automatic singularization and/or positioning of workpieces. In this respect, any desired elements can be handled as workpieces, in particular also asymmetrical workpieces beside workpieces with one or more planes or symmetry or axes of symmetry. Furthermore, workpieces can be handled in this respect which only have one gripping point or workpieces having a plurality of gripping points. The apparatus in accordance with the invention can in this respect in particular be used for handling metal workpieces. The workpieces can, however, naturally comprise any desired materials and in particular also plastic. The workpieces can furthermore also comprise a plurality of materials, for example a combination of plastic parts and metal parts.

In part in this respect, a gripper for picking the workpiece is combined with an object recognition device for detecting the workpieces so that the gripper can be controlled using the data determined by the object recognition device. Such apparatus in particular serve the automated handling of randomly arranged workpieces.

The object recognition device for detecting the workpieces can in this respect comprise any desired sensor whose data allow an object recognition of the workpieces. A laser scanner can in particular be used in this respect. Alternatively or additionally, the object recognition device can comprise one or more cameras. The object recognition device in this respect preferably allows a 3D object recognition. Alternatively, however, a 2D or 2.5D object recognition is conceivable.

Figure 1:
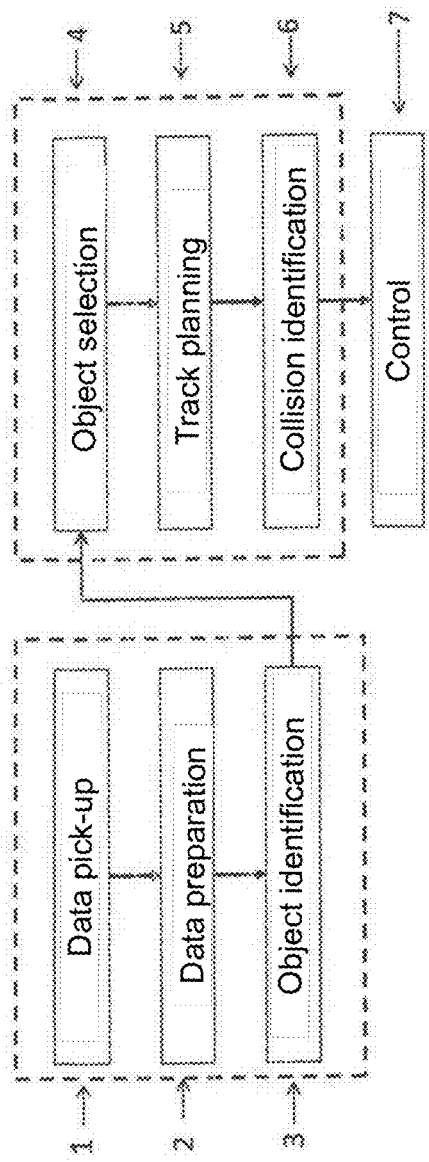
FIG. 1 shows a flowchart of a detection in accordance with the invention of workpieces and of a corresponding control of a gripper.

FIG. 1 shows the typical routine on the detection of randomly arranged workpieces and the corresponding control of a gripper. In step 1, a measurement is carried out by the object recognition device by which data is obtained. These data are processed in a step 2 to allow an identification of the individual workpieces in a step 3. Optionally, the object recognition device can, however, also work using already known positional data of the workpieces.

In step 4, a workpiece which can be picked by the gripper is selected from the identified workpieces. In step 5, the track for the gripper or for the gripping arm moving the gripper is calculated using the positional data of the selected workpiece. In step 6, this track is then checked for possible collisions with interfering edges to prevent collisions. If a collision-free track is found, it is used in step 7 for controlling the gripper, i.e. for traveling the gripper into a picking position toward the selected workpiece.

Such a method can in this respect always be used when a detection of the workpieces and a corresponding control of a gripper take place in accordance with the present invention.

The apparatus and methods in accordance with the invention can in this respect in particular serve the handling of randomly arranged workpieces since the position of the workpieces can be determined by a suitable object recognition device and therefore does not have to be known in advance. The present invention can naturally, however, also be used when the workpieces are already arranged in a certain order.

Any desired apparatus having a plurality of axes of movement can be used for moving the gripper and the gripper can be moved on a defined track and can be traveled toward the workpiece to be picked via the control of said axes of movement.

Figure 2:
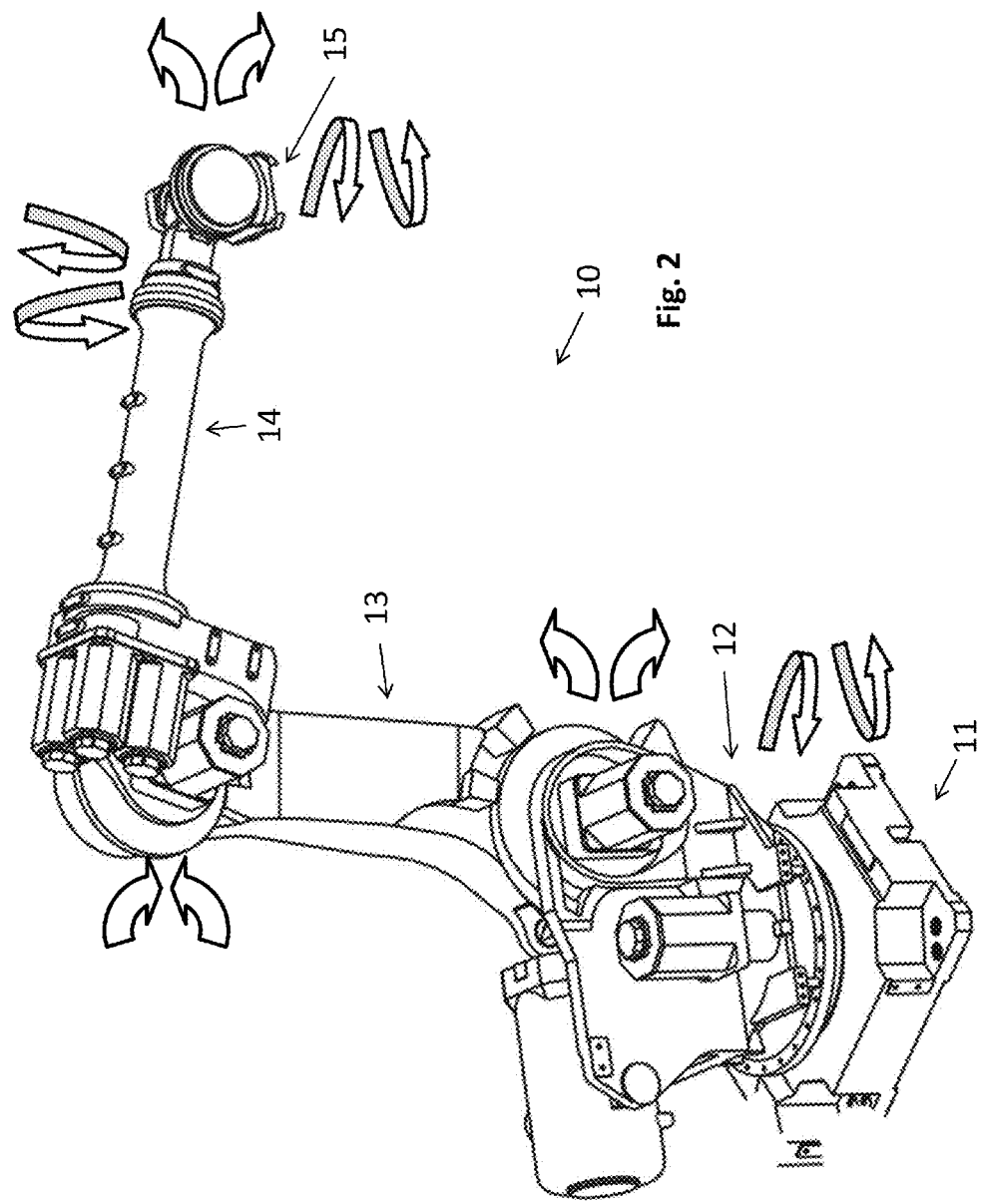
FIG. 2 shows a first embodiment of an apparatus which can be used for moving a gripper in accordance with the invention.

In FIG. 2, a first embodiment of such an apparatus for moving a gripper is shown, with it being a multiaxial robot 10. It is in this respect a six-axial robot in the embodiment. It comprises a base 11 on which a pedestal 12 is arranged rotatably about a vertical axis of rotation. A pivot arm is pivotably arranged about a horizontal pivot axis at the pedestal 12. A rotary arm 14 is arranged around a horizontal pivot axis at the pivot arm 13. The rotary arm 14 furthermore has an axis of rotation which allows a rotation about an axis of rotation arranged in parallel with the rotary arm 14. A gripping arm 15 is arranged around a pivot axis arranged perpendicular to the axis of rotation of the rotary arm 14 at the rotary arm 14. The gripping arm has an axis of rotation which stands perpendicular on the pivot axis. In accordance with the invention, a gripper can be arranged at the gripping arm and can thus be moved and pivoted in space via the control of the axes of movement of the robot.

In FIG. 3, an alternative embodiment for an apparatus for moving a gripper is shown which can be used in all embodiments of the present invention instead of a robot. In this respect, it is a surface portal which has three linear axes of movement and is additionally equipped with a further axis of rotation. In this respect, portal rails 21 are provided at which a portal bar 22 is arranged in a linearly travelable manner. A slide 23 is likewise arranged in a linearly travelable manner at the portal bar 22. An arm is arranged travelable in the vertical direction at the slide 23. This arm is additionally equipped with an axis of rotation 25. The arm can in this respect have a gripper in accordance with the present invention at its lower end.

In FIG. 4a, a first embodiment of an apparatus in accordance with the invention for the automated removal of workpieces is shown which combines an object recognition device 30 for detecting the workpieces with a first gripper 34 for picking the workpieces to remove the workpieces arranged randomly in a container from the container using the first gripper 34. In this respect, the workpieces are not arranged directly at a target receiver by the first gripper 34, but are rather placed down in a random arrangement on the intermediate station from where they are positioned more accurately via a second gripper 41.

The embodiment in this respect has a receiver 31 for a container, not shown, with workpieces randomly arranged therein. Furthermore, a channeling in and channeling out device 32 can be provided for such containers. The object recognition device 30 for detecting the workpieces in the container is provided above the container, not shown. Its data are evaluated as initially described such that the workpieces are gripped in the container via the first gripper 34 and can be removed from it. The first gripper 34 is in this respect moved via a robot 33 in the embodiment. Alternatively, a surface portion can also be used here.

In the embodiment, a magnetic gripper is used as the first gripper 34 since such a magnetic gripper makes less high demands on the delivery accuracy of the gripper to the workpiece and is therefore better suited actually to empty containers 100% having workpieces which are arranged chaotically in them and which moreover can be stacked over one another in random positions, as is possible in accordance with the embodiment of the present invention.

It is in particular possible with a magnetic gripper also to pick workpieces having a non-ideal picking position. In this respect, a certain offset can in particular be present between the gripping surface of the magnetic gripper and a main surface of the workpiece. In addition, a picking is optionally also possible when the magnetic gripper only engages at the highest point of a workpiece. If the control can therefore not identify any workpiece which can be ideally picked using the data of the object recognition device, that is with which an ideal superimposition of the gripping surface and a main surface of the workpiece is present, a picking with an offset or a picking at a highest point can alternatively be made use of Such a picking can equally be made use of when another picking strategy did not result in the picking up of a part.

A pneumatic gripper could also be used alternatively to the magnetic gripper 34. It is equally conceivable to replace the magnetic gripper 34 shown in the embodiment in accordance with FIG. 4a by a mechanical gripper if the workpieces are shaped such that they can also be reliably picked in the container by a mechanical gripper.

The first object recognition device 30 can furthermore be used to recognize workpieces which arrived erroneously in the container. If a workpiece is detected in this respect which does not satisfy the required workpiece criteria and is therefore not to be positioned at a target receiver, this can be separated out, for example in that the workpiece is picked and is placed in a corresponding container.

In accordance with the embodiment, the workpieces are not arranged at a target receiver by the first gripper, but are rather placed on an intermediate station from where they are picked up again by the second gripper 41 and are then positioned more accurately. The placing down of the workpieces on the intermediate station can take place in a random arrangement in this respect. The workpieces can in this respect in particular be dropped by the gripper 34 from a predefined height onto a placing region 35 of the intermediate station. The placing region 35 is in this respect configured as a sloping plane from which the workpieces slide to a further transport zone.

The placing region 35 can have one or more height sensors which determine the height of a workpiece arranged at the gripper 34 above the placing region. In this respect, in particular a light barrier arrangement 37 can be provided which is arranged to the side of the slanted plane 35. If in this respect a workpiece arranged at the gripper 34 arrives in the region of the light barrier arrangement, this means that the workpiece is arranged at a certain height above the slanted plane 35. The gripper 34 thereupon drops the workpiece. This procedure has the advantage that the position of the workpieces at the gripper 34 does not have to be exactly known. Collisions of the gripper with the placing region are nevertheless prevented. Provision can in this respect in particular be made that the gripper 34 first moves in a horizontal direction into a position above the placing region 35 after the picking up of a workpiece from the container and then lowers it so far until the vertical sensor responds.

The intermediate station furthermore has a transport belt 38 which transports the workpieces from the placement region 35 on to a removal region 44.

The workpieces in this respect slide from the slanted plane onto the transport belt 38, with the slanted plan 35 being able to be bounded by lateral abutment regions 36 which narrow the slanted plane downwardly so that the workpieces are directed to a defined further transport region of the transport belt.

This further transport region is advantageously equipped with an occupation sensor 39. It can in this respect in particular be a light barrier arrangement which determines the height of the workpieces placed on the transport belt. If a plurality of workpieces are stacked above one another, the occupation sensor responds. In this case, the further loading of the intermediation station by the first gripper 34 is stopped until the occupation sensor again signals a sufficiently free further transport region.

The workpieces are transported on the transport belt 38 into the removal region 44 and are there picked by the second gripper 41 to be positioned more accurately or to be singularized. In this respect, a second object recognition device 42 is provided which detects the workpieces in the removal region, with the second gripper 41 being controlled with reference to the data of the second object recognition device. A robot 40 is in turn provided for moving the second gripper 41. Alternatively, a surface portal could also be made use of here.

The second object recognition device 42 is necessary for picking the workpieces since they lie in a random arrangement on the intermediate station or on the transport belt. The picking situation on the intermediate station is, however, substantially simpler than with the container since the workpieces are all arranged in the same plane, i.e. on the transport belt, at least in the vertical direction. In addition, the workpieces are already presingularized and so can be picked more easily. In addition, the workpieces have a defined distance from the object recognition device 42 so that it works more accurately.

The second object recognition device 42 can furthermore be used to recognize workpieces which arrived erroneously on the intermediate station. If in this respect a workpiece is detected on the intermediate station which does not satisfy the required workpiece criteria and is therefore not to be positioned at a target receiver, it can be separated out, for example in that the workpiece is picked and is placed into a corresponding container or in that it is not picked and transported via the transport belt further into a container.

Provision can be made in this respect that the second object recognition device allows a more accurate detection of the workpieces than the first object recognition device so that incorrect workpieces are reliably recognized on the intermediate station.

In accordance with the invention, a mechanical gripper 41 can therefore be used as the second gripper which admittedly makes higher demands on the delivery of the gripper to the workpiece, but also allows a substantially more exact picking and positioning of the workpieces. In the embodiment, the mechanical gripper is a finger gripper, in particular a two-finger gripper such as will be presented later.

The control of the transport belt is in this respect in communication with the object recognition device 42 and the control of the gripper 41. In this respect, the transport belt stops in each case when a detection of the workpieces and the following picking of a workpiece by the gripper 41 takes place. If, in contrast, there are no longer any workpieces in the removal region 44, the transport belt is moved on until workpieces are again located in the removal region 44. For this purpose, a light barrier arranged laterally at the transport belt in the removal region can optionally also be used for this purpose in addition to the data of the object recognition device.

The side walls of the transport belt 38 can be chamfered, as can be recognized in FIG. 4a. It is hereby prevented that workpieces remain in unfavorable positions directly at the side wall which do not allow any picking.

Provision can furthermore be made that a reorientation apparatus is provided transversely over the transport belt 38 which flips over unfavorably arranged workpieces and thus brings them into a better position for picking by the second gripper 41. For example, a flap, not shown, or an abutment bar can be provided for this purpose which are arranged above the transport belt 38. Such a reorientation apparatus can in particular be arranged between the further transport belt 38 and the removal region 44 of the transport belt.

In this respect, provision can be made in accordance with the invention that workpieces which cannot be picked at all by the gripper 41 fall into a collection container arranged at the end of the transport path 38. Alternatively, a peripheral transport belt 43 can be provided such as will be described in more detail later.

Alternatively to the transport belt which is used as the transport device in FIG. 4a, a number of other alternatives are available for the configuration of the transport device. The basic idea of the intermediate station is in this respect the design with a loading side and an unloading side, a transport device between the two sides and a further object recognition device over the removal side. The transport from one side to the other side can take place as follows, for example:

Driven Transport Device:
    Linearly working transport device
        Pusher, shuttle, slide, in particular driven by linear drives such as a pneumatic cylinder
        Transport belt
    Circular
        Round, segment table, circular store
        Loop or circular belt
    A plurality of planes above one another
        From bottom to top
        From top to bottom
Non-driven Transport Devices:
    Slanted plane on which the workpieces slide down
Combination of the above-named driven transport devices and/or non-driven transport devices The position of the workpiece is preferably changed during the transport to increase the removal accuracy (place down inaccurately, remove accurately). This can be achieved by end abutments, guide rails with chamfer, spring mechanisms, etc. The intermediate station can furthermore also be used as a transfer picking site.

Figure 4B:
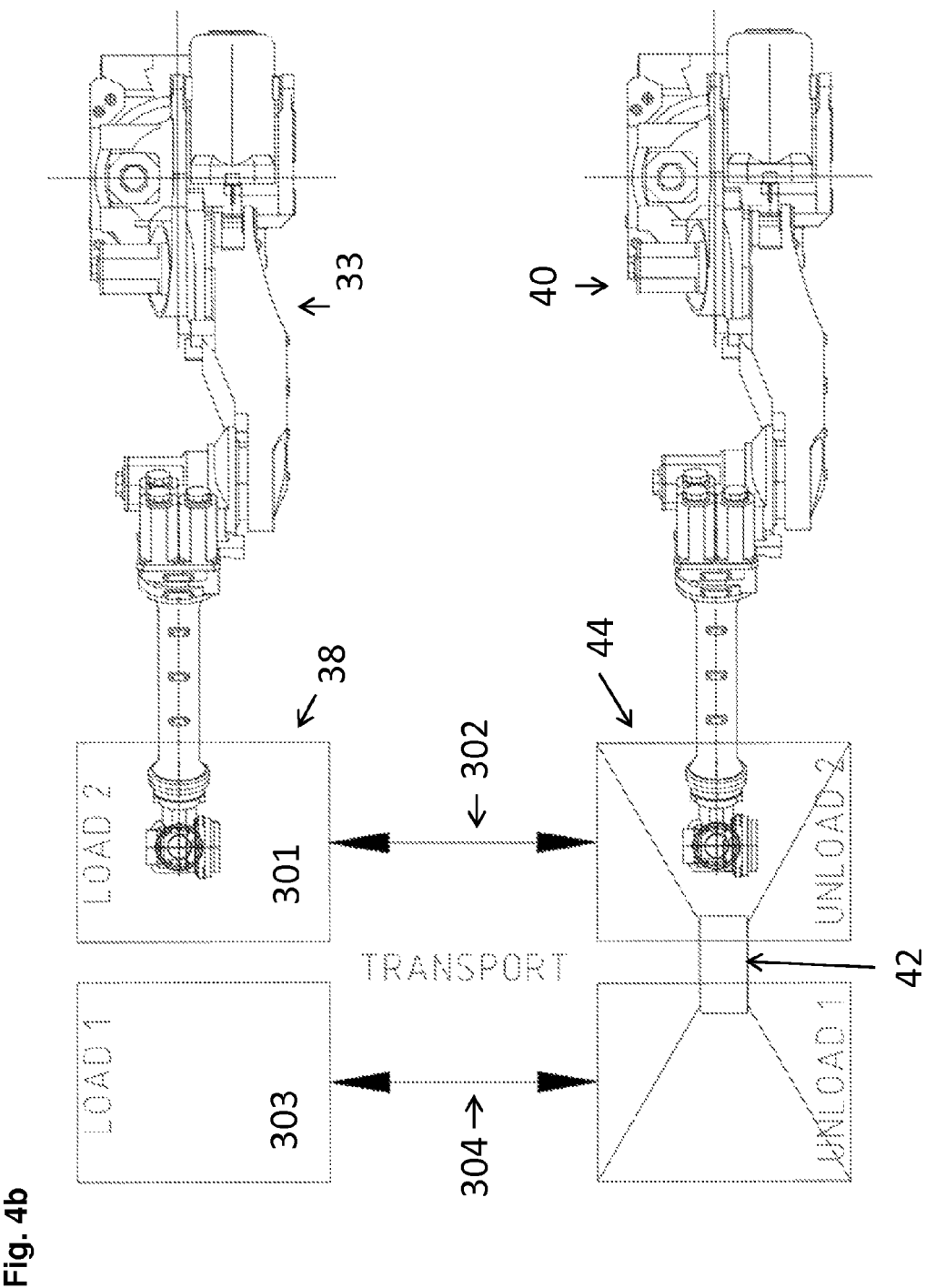

In this respect an alternative configuration of the transport device on the intermediate station is shown in FIG. 4b such as can be used in the embodiment shown in FIG. 4a. In the upper region, the first gripper 33 is shown which picks the workpieces from the container and places them in the placing region 38 on the intermediate station. In the lower region, the second gripper 40 is shown which removes the workpieces in the removal region 44. The second object recognition device 42 is furthermore shown which is arranged in the region of the removal region 44.

In this respect a first transport plate 301 is provided as the transport device which can be traveled from the placing region 38 to the removal region 44 and back via a linear drive 302 such as a pneumatic cylinder. In addition, a second transport plate 303 is provided which can likewise be traveled from the placing region 38 to the removal region 44 and back via the linear drive 304. The two transport plates and linear drives can be configured identically in this respect. The two transport devices can furthermore be arranged in parallel with one another. An empty transport plate is always available for loading or a filled transport plate for unloading through the embodiment with two transport plates so that the system can work without waiting times.

Figure 6:
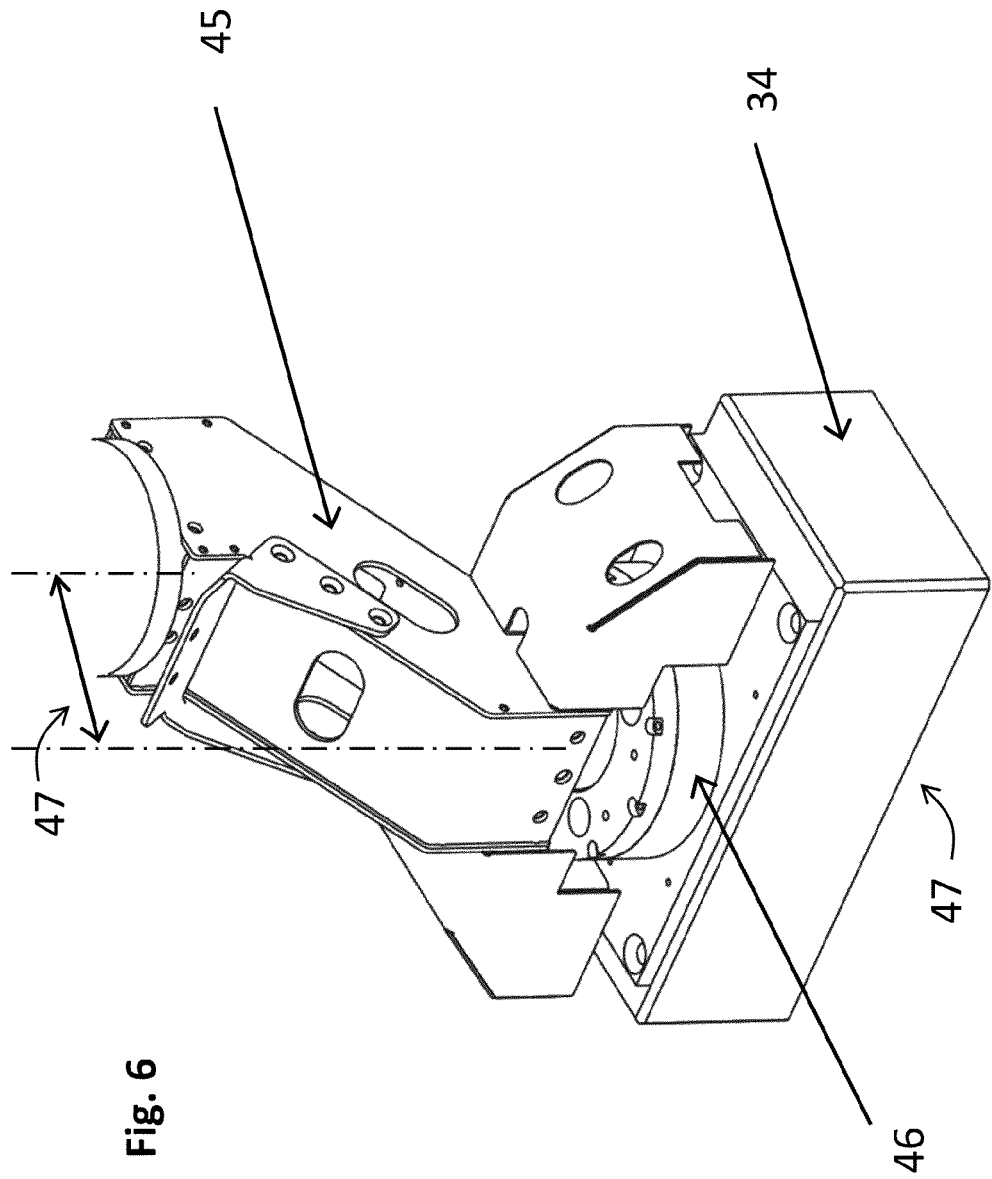
FIG. 6 shows a detailed view of the gripper shown in FIG. 5.

In FIGS. 5 and 6, an embodiment of a first gripper in accordance with the invention is now shown again such as can in particular be used for picking up the workpieces from a container. It is a magnetic gripper 34 in this respect. In this respect, a magnetic gripping surface 47 is provided at the lower side of the gripper. The magnetic gripper 34 in this respect has an electromagnet which generates a magnetic force on the magnetic gripping surface 47 for holding magnetizable objects.

The gripper in accordance with the invention is arranged cropped at the end member of the gripping arm, for example at the end member of the gripping arm of a robot 33. In this respect, a central axis of the gripper 34 or of the magnetic gripping surface 47 is arranged offset by a spacing 48 from an axis of rotation of the last pivot joint of the gripping arm. For this purpose, a cropped arm 45 is provided which connects the magnetic gripper 34 to the gripping arm. It is possible by the cropped configuration of the gripper also to use it directly next to a side wall of the container in the interior of the container for picking workpieces. It is thus in particular avoided that interfering edges further up at the gripping arm prevent a moving of the magnetic gripper directly to a wall region of the container.

A compensation unit 46 such as will be described in more detail in the following can furthermore be provided. This prevents an overload of the gripping arm from taking place on a collision of the gripper 34 with interfering edges or with workpieces. In addition, it is prevented that a safety deactivation of the robot is activated which would only be able to be bridged manually.

Figure 7:
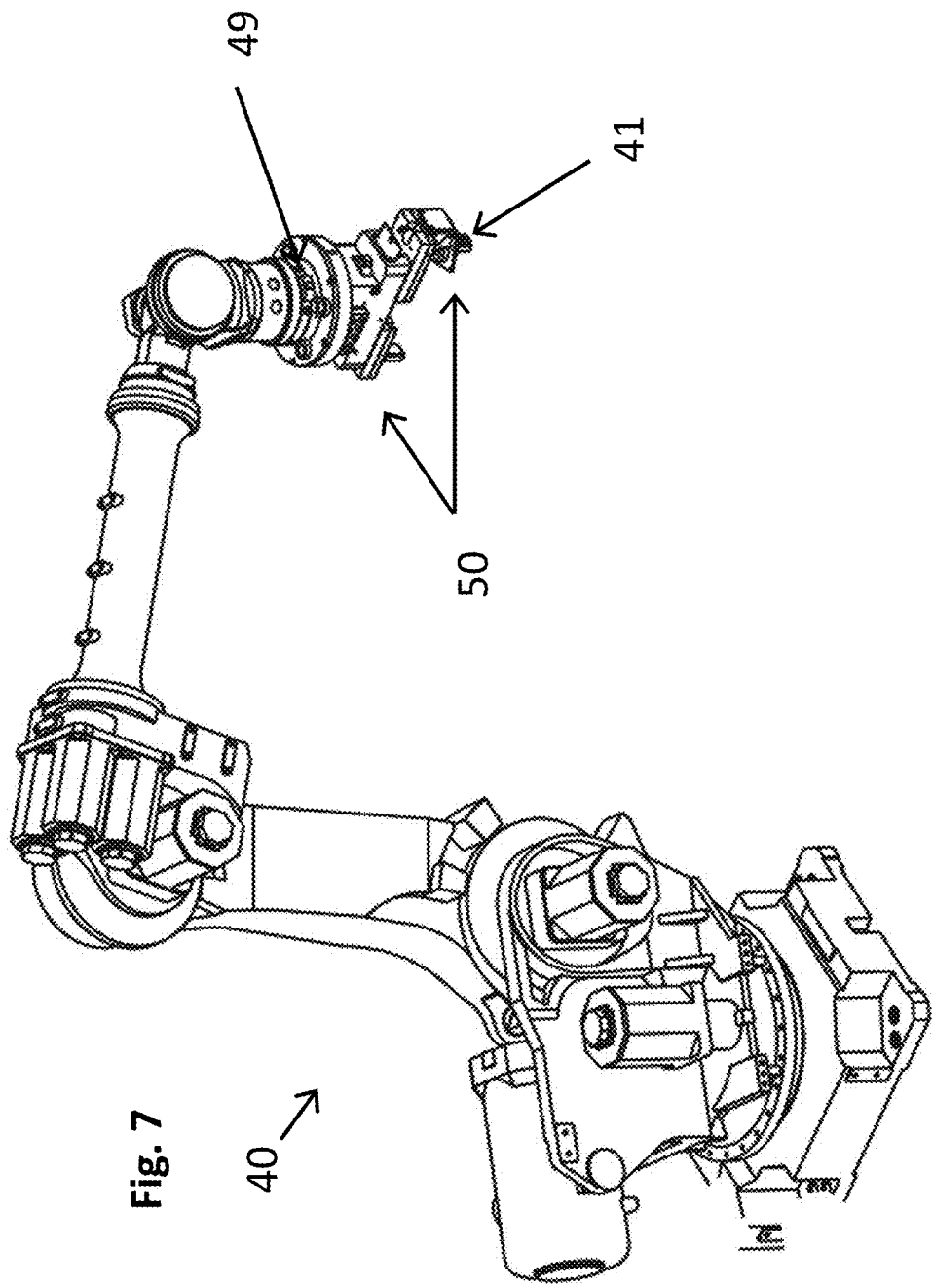

In FIG. 7, an embodiment of the second gripper 41 is shown which is likewise arranged at a gripping arm of a robot 40. In the embodiment, a two-finger gripper having fingers 50 which can be traveled in a linear manner is used as the gripper in this respect. The fingers can in this respect move into cut-outs of the correspondingly shaped workpieces and can grip the workpiece by moving apart or moving together. With differently shaped workpieces, other mechanical grippers can naturally also be used, in particular three-finger or multifinger grippers or bar grippers. A compensation unit 49 which protects the robot arm from overload on collisions is also provided in the embodiment shown in FIG. 7.

Figure 8:
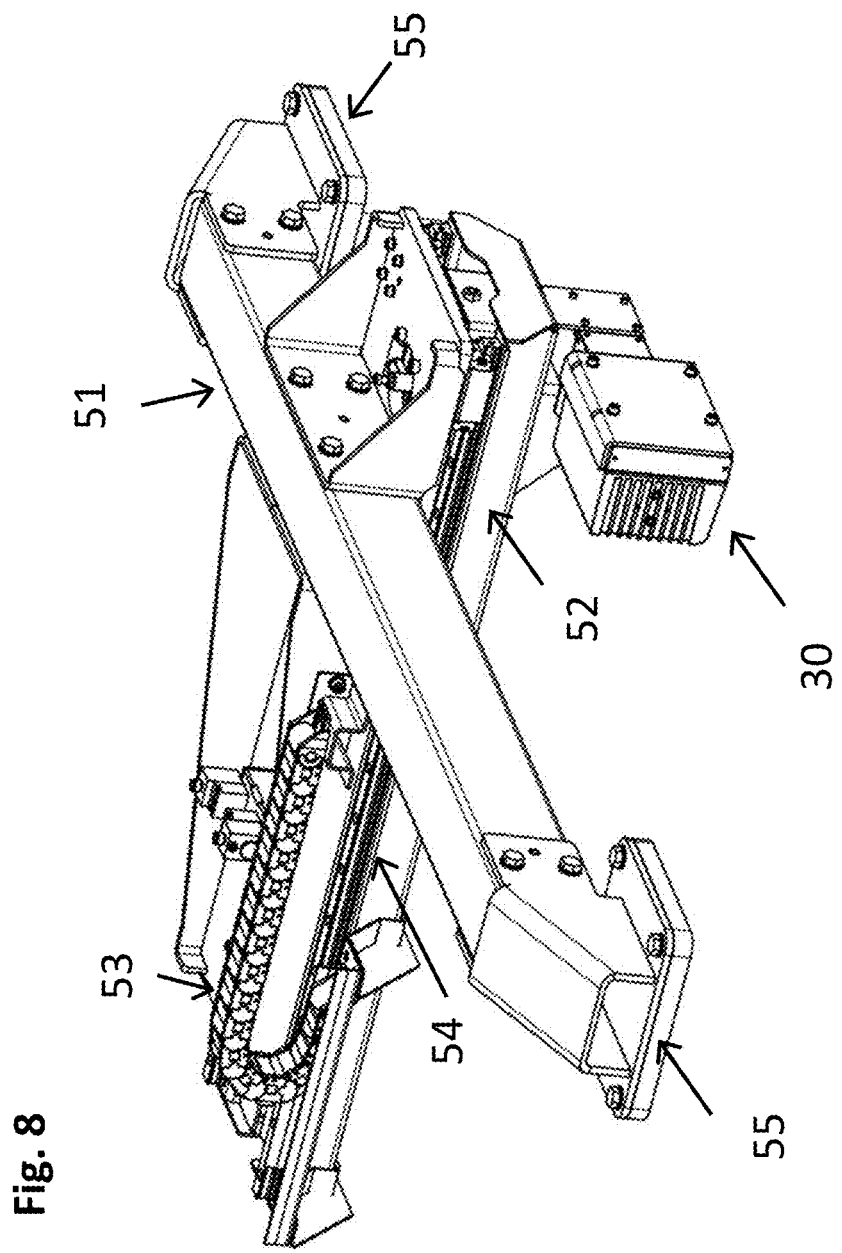

FIG. 8 shows an embodiment of an object recognition device for detecting workpieces which can be traveled from a position of rest into a measuring position and back by a travel arrangement.

The object recognition device shown in FIG. 8 can in this respect in particular be used in the embodiment shown in FIG. 4a as an object recognition device 30 for detecting the workpieces in a container. The second object recognition device 42 used in the embodiment shown in FIG. 4a for detecting the workpieces on the intermediate station is in contrast rigid in the embodiment. Alternatively, however, this object recognition device 42 could also have a travel arrangement to be able to travel from a position of rest into a measuring position and back.

The object recognition device shown in FIG. 8 has a sensor 30 which detects the workpieces. The sensor 30 is arranged at a sensor arm 52 which is arranged in a travelable manner at a guide rail 54. The guide rail 54 is in turn arranged at a mounting bar 51 in order to thus be able to mount the fastening pieces 55 on a pedestal. The exact arrangement of the two pedestal columns can be recognized in FIG. 4a.

In the embodiment shown in FIG. 4a, the object recognition device is in this respect arranged on pedestal columns such that the containers can be led between the pedestal columns on the channeling into a removal position.

Figure 9:
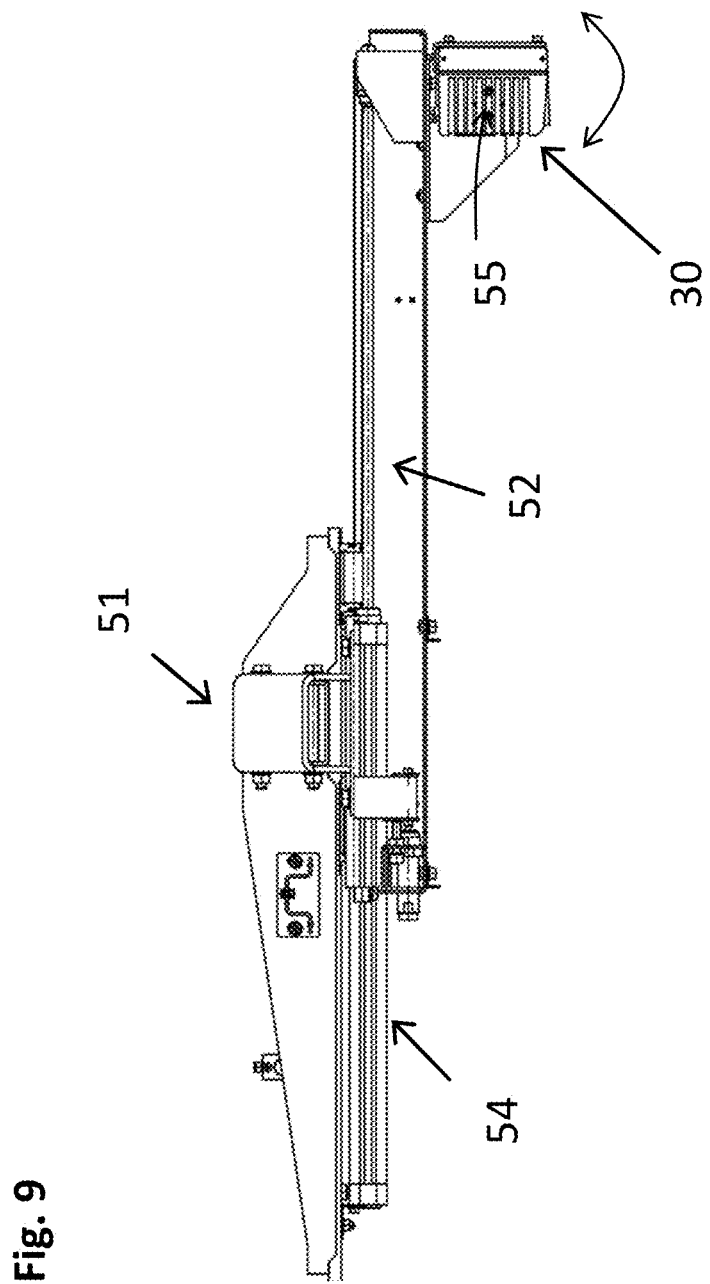
FIG. 9 shows the travelable object recognition device shown in FIG. 8 in a side view.

As can be recognized in FIGS. 8 and 9, the sensor 30 can be traveled along the guide rail 54 by moving the sensor arm 52. In the embodiment, the object recognition device is structured in this respect such that the sensor 30 can be traveled in a horizontal direction.

In the position of rest, the object recognition device is located outside a collision region with the first gripper 34 so that it has free access to the container. The sensor 30 is then traveled over the container by traveling out the sensor arm 52 into the measuring position in which the detection of the workpieces takes place for detecting the workpieces in the container. In its measuring position, the sensor 30 is located approximately centrally above the container. After the measurement, the sensor is again moved back into the position of rest in which it is arranged outside the base surface of the container.

In this respect, the movements of the object recognition device and of the removal gripper 35 are synchronized with one another so that the detection of the workpieces in the container always takes place when the gripper 34 places a workpiece on the intermediate station. The object recognition device is then traveled back into the position of rest so that the gripper 34 can remove a new workpiece from the container. In the following placing of the workpiece on the intermediate station, a measurement in turn takes place.

A similar procedure would in this respect also be conceivable with the second object recognition device 42 and the second gripper 41.

Alternatively or additionally, the object recognition device could also be traveled in the vertical direction. On the one hand, such a vertical travel capability could be used in the same way as the horizontal travel capability to move the sensor out of a collision region with the gripper when the latter picks up a workpiece and to move it closer toward the workpieces again to carry out a detection. In addition, it would be conceivable to track the object recognition device in a vertical direction with an emptying filling level of the container so that the object recognition device is always arranged in an unchanging distance region from the workpieces arranged the highest in the container in the measurement. A constant detection quality can hereby be achieved.

In the embodiment, a laser scanner can be used as a sensor of the object recognition device. The scanner can in this respect transmit a plurality of laser beams at small intervals so that a fan of laser beams is created. The fan formed by the laser beams is then pivoted over the detection region by pivoting the sensor, whereby a spatial detection of the detection region takes place. Geometrical data are created in this respect by distance measurement using the laser beams.

An arrangement of the sensor approximately centrally above the container in this respect has the advantage that the side walls of the container do not form shadows. The travel capability of the sensor in this respect makes it possible to position the sensor in the measuring position at a sufficiently small distance from the workpieces to be measured and nevertheless not to come into conflict with the gripper or with the gripper arm moving the gripper. This is in particular of special importance when detecting the workpieces in the container since the scanner has to be positioned so low above the container, at least when it cannot be traveled vertically, that it still detects workpieces with sufficient accuracy with an almost emptied container.

Figure 10:
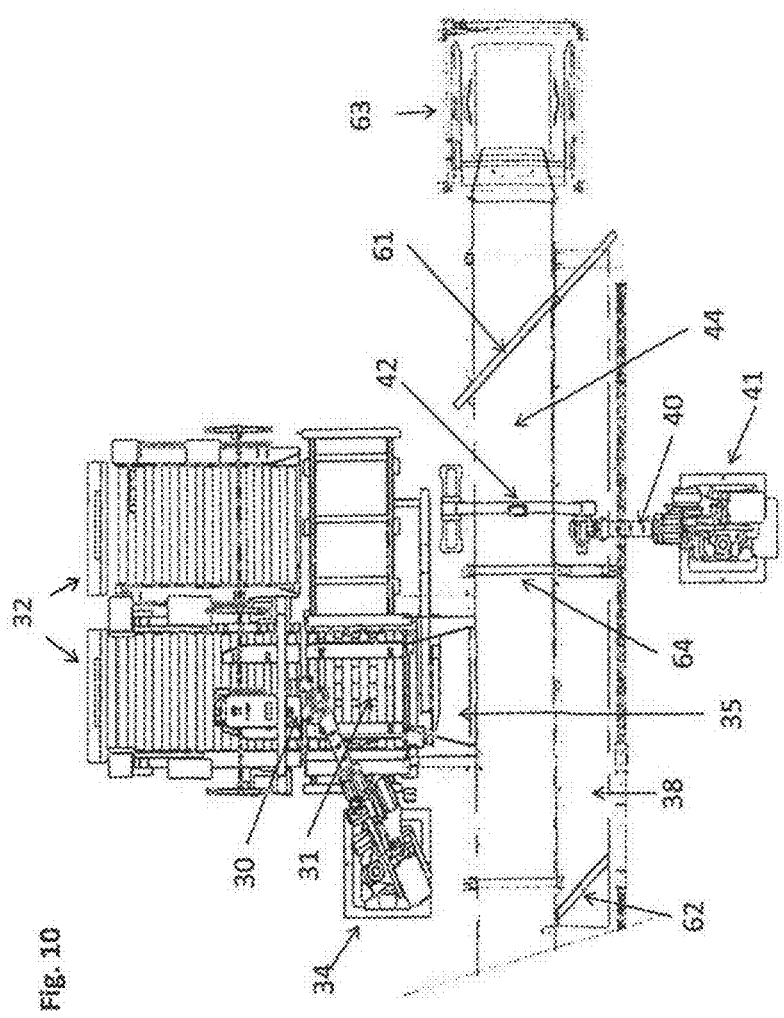
FIG. 10 shows a second embodiment of an apparatus in accordance with the invention for the automated removal of workpieces randomly arranged in a container in which an embodiment of an intermediate station in accordance with the invention having a revolving transport path is used.

In FIG. 10, a further embodiment of an apparatus in accordance with the invention for the automated removal of workpieces from a container is shown which is based on the embodiment shown in FIG. 4a and in which the peripheral transport path of the intermediate station is provided which is only indicated schematically in FIG. 4a. Except for the differently configured intermediate station, all the components in this respect correspond to the embodiment shown in FIG. 4a so that reference is made to the description there with regard to the total design of the apparatus.

The intermediate station also has a first transport belt 38 in the embodiment shown in FIG. 10, which transport belt transports workpieces placed in a placing region 35 to a removal region 44. The workpieces are there detected by the object recognition device 42 and are picked and removed by the gripper 41 which is moved by the gripping arm 40.

In accordance with the invention, the intermediate station shown in FIG. 10 is now equipped with a return path 60 which allows workpieces not removed in the removal region 44 to run around. The return path 60 is in this respect likewise a transport belt which is arranged next to the first transport belt 38 and is moved in the opposite direction. The return path 60 in this respect ensures that workpieces not removed in the removal region 44 are transported back and again arrive on the first transport belt 38 so that they again move into the removal region 44 where they can again be detected and picked.

If therefore a workpieces on its first detection lies at such a position in the removal region 44 that it cannot be picked or can only be picked with difficulty, the control can dispense with a picking attempt and can allow the workpiece to run around. The circulation path is in this respect designed such that the workpiece is very highly likely to arrive in the removal region 44 in a different position on the next circulation so that there is a high probability that the workpiece lies in a position which can be picked more easily on the second attempt. Workpieces with which an unsuccessful picking attempt was made can also be treated in the same way.

The removal region could also be arranged in the region of the return path in the embodiment shown in FIG. 10 without the function of the intermediate station changing.

Since the workpieces lie randomly arranged on the transport belts 38 and 60, the probability is very high that they change their position on the circulation. This can be assisted by further measures in accordance with the invention. An abutment 61 is thus provided, for example, which extends obliquely over the first transport belt 38 and forces the workpieces from the first transport belt 38 onto the return path 60. In the same way, an abutment 62 is provided at the end of the return path 60 which conveys the workpiece back onto the first transport path 38 again. In this respect, a positional change of the workpieces is effected solely by the contact with the abutments and the forcing onto the respective other belt.

Provision can furthermore be made that the workpieces run through a vertical difference during the circulation. A slanted plane or an edge having a vertical difference can in particular be provided in this respect over which the workpieces are forced. A position change is also hereby effected. At the same time, workpieces caught up with one another can optionally be separated from one another.

In this respect, a slanted plane which the workpieces slide down is advantageously provided in the transition region between the first transport belt 38 and the return path 60. The first transport path 38 in this respect advantageously extends in the vertical direction, whereas the return path 60 is arranged obliquely so that a vertical difference results in at least one of the two end regions of the two transport paths.

To prevent parts which cannot be picked from remaining on the circulation path for an unlimited time, a separation mode can be provided in which the circulation is ended under certain conditions and the workpieces are emptied into a collection container 63. The abutment 61 can in particular be moved for this purpose such that the workpieces are transported via the first transport path 38 up to its end and into the container 63 placed there.

In this respect, in particular a separation mode can be provided in which no new workpieces are placed onto the intermediate station by the first gripper. At least one picking attempt then takes place with all the workplaces located on the intermediate station. In this respect, a plurality of circulations can optionally also be carried out. The workpieces then remaining on the intermediate station can then be emptied into the container 63. It is thereupon in turn possible to switch into the normal mode.

The separation mode can furthermore be used to separate out workpieces which erroneously arrived on the intermediate station. The separation mode can thus be activated when a workpiece was detected on the intermediate station which does not satisfy the demanded workpiece criteria and is therefore not to be positioned at a target receiver.

In the embodiment of an intermediate station shown in FIG. 10, the reorientation device 64 is also shown which was already described with regard to the embodiment in FIG. 4a but which was not shown there. In this respect, it is a flap which is arranged above the first transport belt 38 between the placing region and the removal region. The flap 64 should in this respect in particular flip over workpieces standing on their edge to make them easier to pick.

Figure 11:
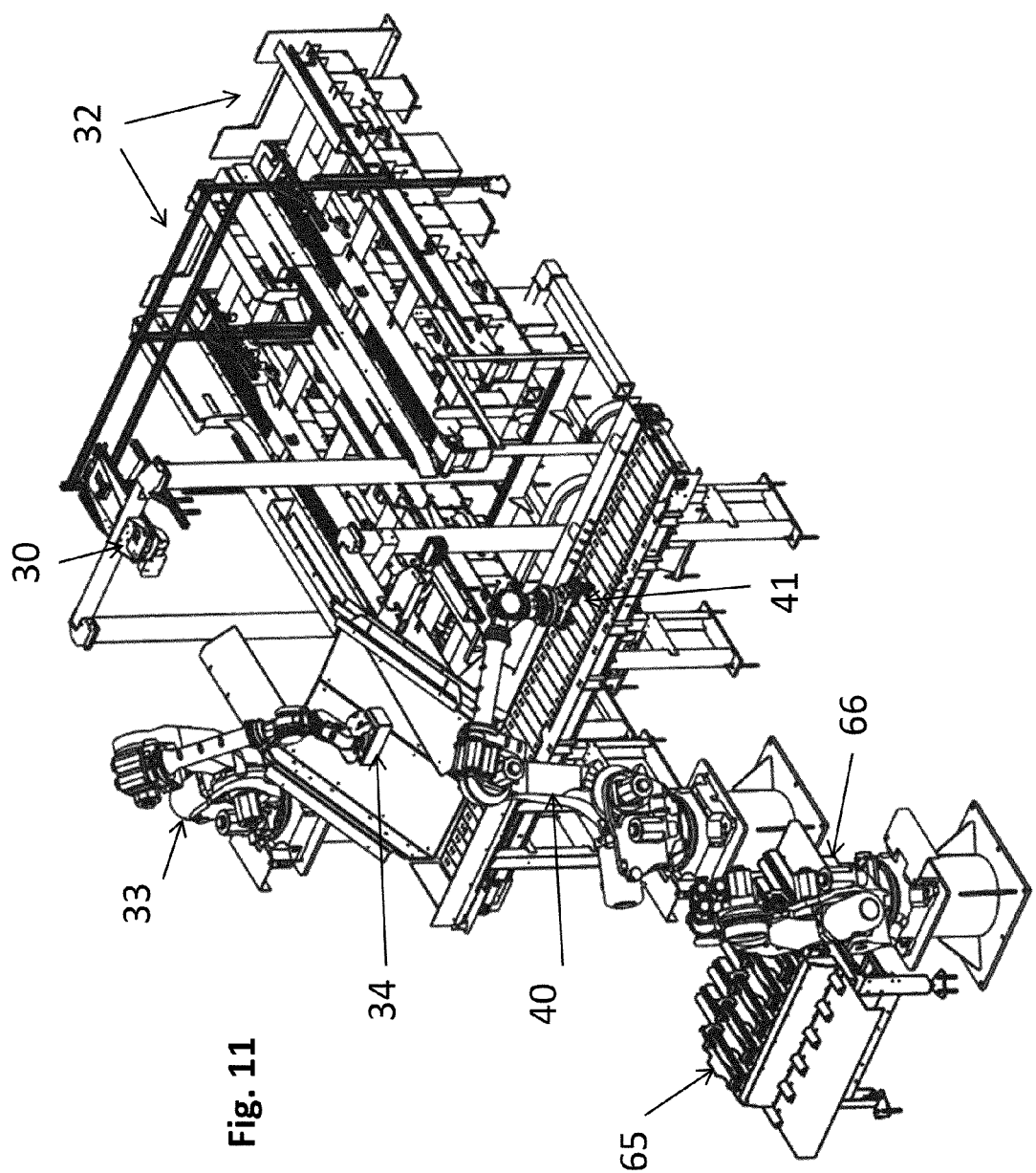
FIG. 11 shows a third embodiment of an apparatus for the automated removal of workpieces randomly arranged in a container, which is based on the embodiment shown in FIG. 4a and which furthermore comprises an embodiment of a second intermediate station on which workpieces can be placed in at least one receiver.

In FIG. 11, a further embodiment of an apparatus in accordance with the invention for the automated removal of workpieces arranged in a container is shown. This embodiment is also based on the embodiment shown in FIG. 4a so that reference is first made to the description of the embodiment shown in FIG. 4a with respect to the configuration.

On the one hand, the channeling in and out for containers with workpieces is shown which is only shown schematically in FIG. 4a. They are put to one side and are moved from there in an automated fashion into the removal region 31. The workpieces are now removed after one another by the first gripper 34 until the container is 100% empty. The emptied container is thereupon moved to the channeling out path and is channeled out from there.

In this respect, a safety detection of the container interior advantageously takes place again after the removal of the last workpiece to ensure that actually no more workpieces remain in the container. If therefore the control only identifies a single workpiece on a detection procedure and if the gripper was controlled accordingly to remove it, a further detection procedure is nevertheless initiated. Only in this way can it be ensured that the last detected workpiece was also actually removed.

Furthermore, the embodiment shown in FIG. 11 shows a second intermediate station 65 on which the workpieces removed from the first intermediate station by the gripper 41 are placed to be picked again. The placing on the second intermediate station in this respect takes place in a defined position, with the placing serving to be able to pick more accurately on the picking up and/or to be able to vary the orientation of the workpiece at the gripper. The second intermediate station can furthermore also serve as a buffer store.

Figure 12:
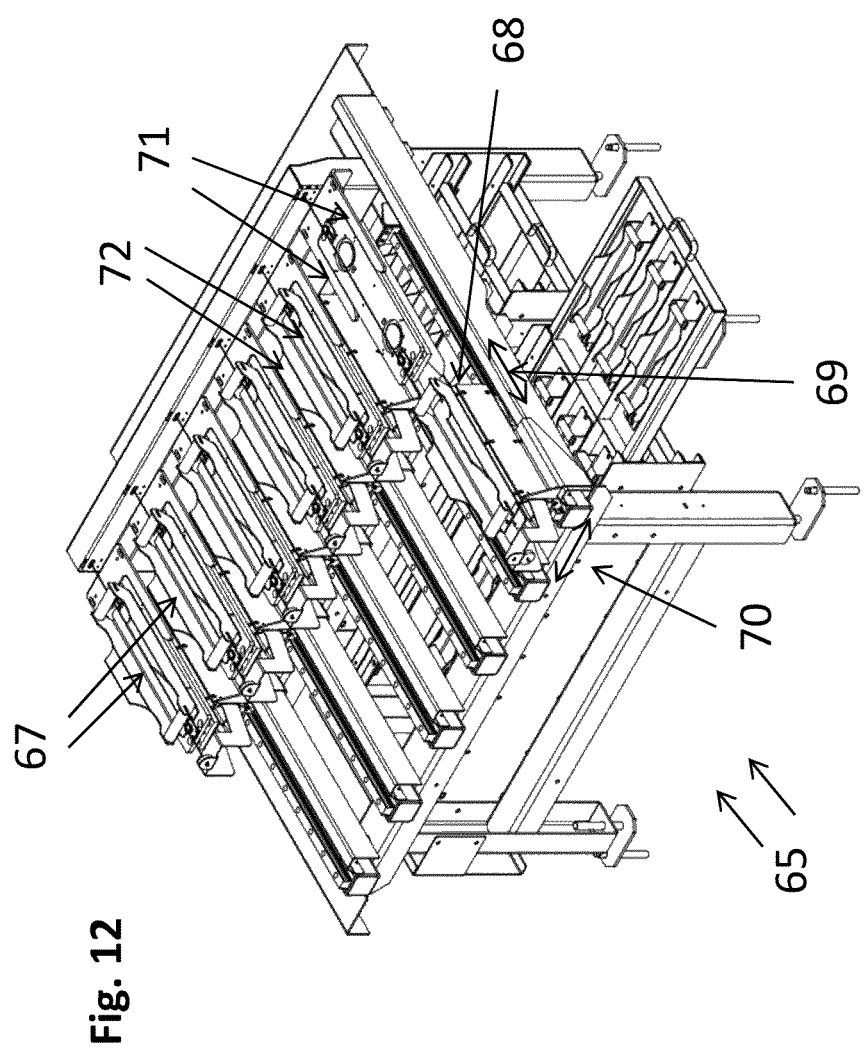
FIG. 12 shows the embodiment of a second intermediate station as is used in the apparatus in accordance with FIG. 11 in a detailed view.

An embodiment of such an intermediate station 65 is shown in FIG. 12. The intermediate station has at least one receiver 67 for the workpieces into which the workpiece can be placed in a defined position and orientation. In the embodiment, in this respect, a plurality of such receivers 67 are arranged next to one another so that the intermediate station also serves as a buffer store.

The receivers 67 have a compensation apparatus 70 which also allows a placing of the workpieces in the receiver 67 with a certain positional offset in that the receiver is moved by the contact with the workpiece to be placed down. For this purpose, the receiver 67 has receiver steps 72 against which a badly positioned workpiece first abuts and in so doing causes a movement of the receiver by which the workpiece can be placed in the receiver.

The receiver 67 thus allows a placing of workpieces in a defined positional region and thus in particular also allows the placing of workpieces not exactly picked in a desired position.

The compensation unit 70 can be fixed on the intermediate station so that the receiver and thus the workpiece is arranged in a defined desired position for the removal. The removal of the workpiece can hereby take place with a greater accuracy.

The receivers 67 are displaceable on rails 69 at the intermediate station. In this respect, the receivers can be displaced from a loading position, in which the compensation unit allows a movement of the receivers 67, into a removal position in which the compensation unit is fixed. Abutments 71 are provided for this purpose into which the receiver 67 is traveled and which fix the receiver in a defined position.

The placing and the removal of workpieces onto the second intermediate station 65 in this respect in each case advantageously takes place by mechanical grippers since they have a relatively high picking accuracy by which the workpieces can be placed in a defined manner in the receivers and can be picked up again with a higher accuracy.

The picking of the workpieces on the second intermediate station in this respect takes place without a previous detection of the workpieces in that the grippers are traveled to the known removal position of the receiver.

The receivers are furthermore designed so that the workpieces can be picked from two different directions. In the embodiment, the workpieces in this respect have cut-outs into which the fingers of a finger gripper engage. The receivers are designed in this respect such that the cut-outs are accessible from two sides in the workpieces when a workpiece is arranged in the receiver. The orientation of the workpiece at the gripper can hereby be reversed in that the workpiece is picked from one side on the placing down, but from the other side on the picking up.

In this respect, the placing down and the picking up can take place by the same gripper. In the embodiment shown in FIG. 11, however, two separate grippers are used.

Figure 13:
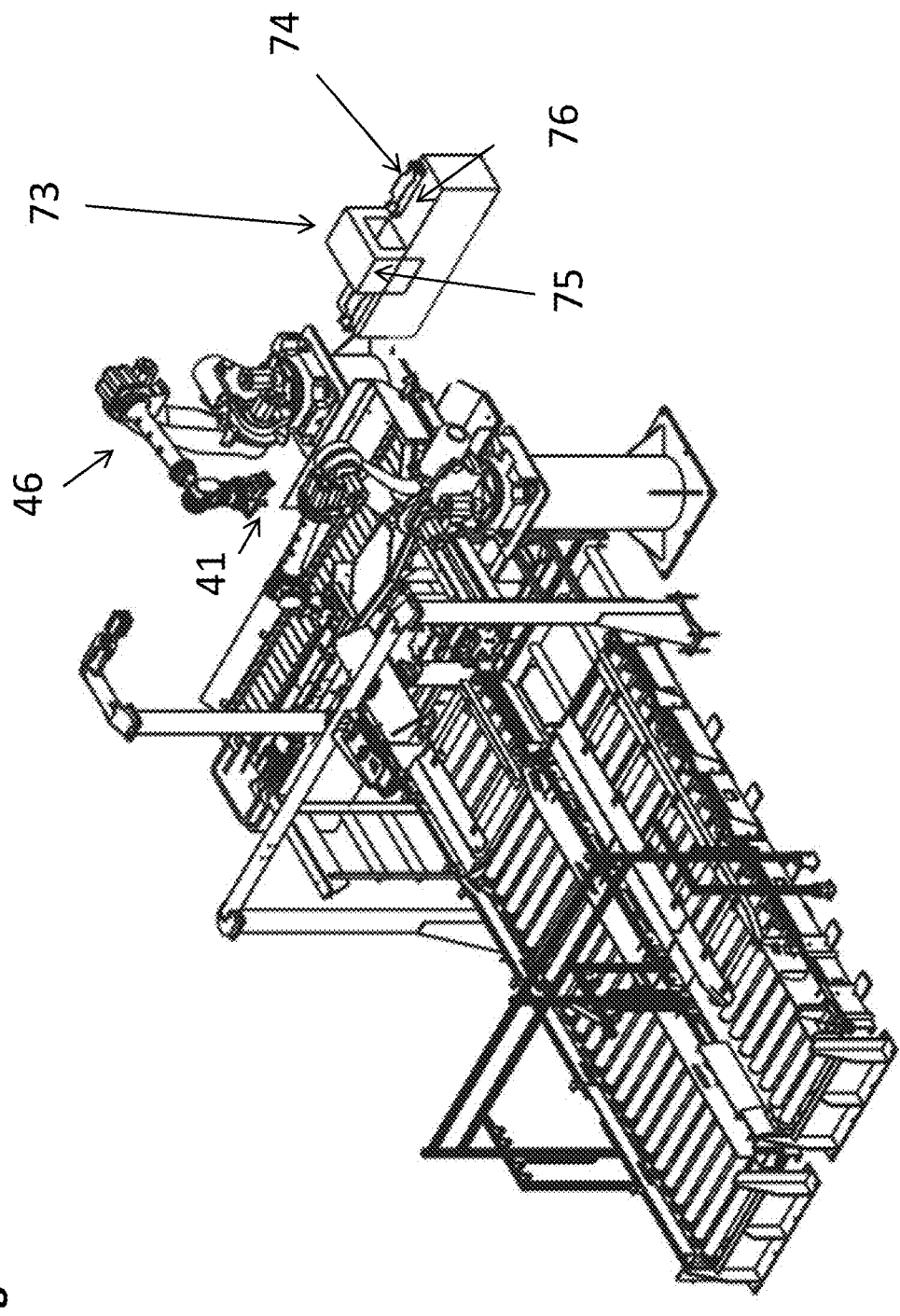
FIG. 13 shows a fourth embodiment of an apparatus in accordance with the invention for the automated removal of workpieces randomly arranged in a container, which is based on the embodiment shown in FIG. 4a and which furthermore comprises a second embodiment of a second intermediate station on which workpieces can be placed in a receiver.

In the embodiment of an apparatus in accordance with the invention shown in FIG. 13, which is likewise based on the embodiment shown in FIG. 4a, a further embodiment for a second intermediate station 73 is now shown. This intermediate station also has at least one receiver 74 in which workpieces can be placed down in a defined manner. The receiver is in this respect designed in exactly the same way as the receivers shown in FIG. 12.

The intermediate station shown in FIG. 13 in this respect has a transport belt by which the receiver 74, which is at least movable to a certain extent on the transport belt, can be traveled toward abutments to fix it in its position. A compensation unit is also hereby provided which allows a placing down of the workpieces in the receiver 74 with a certain offset and which nevertheless moves the workpiece or the receiver for removal into a defined position so that picking can again take place with higher accuracy. Furthermore, picking can also take place here from both sides to change the orientation of the workpiece at the gripper.

The intermediate station 73 shown in FIG. 13 is furthermore equipped with a functional unit 75 which the workpieces run through on the intermediate station. The functional unit is in this respect a demagnetization station through which the workpieces are guided on the intermediate station.

In the embodiment shown in FIG. 13, the same mechanical gripper 41 is in this respect used both for placing the workpieces on the intermediate station 73 and for removing the workpieces.

Furthermore, a determination of the picking accuracy can take place with an apparatus for the automated handling of workpieces in accordance with the present invention. It can in this respect in particular be determined whether and/or how much the position of a workpiece picked up at the gripper differs relative to the gripper from a predefined desired picking position or from a predefined desired picking position region. The process routing of the handling is advantageously then controlled in dependence on the result of such a picking accuracy determination.

Figure 14:
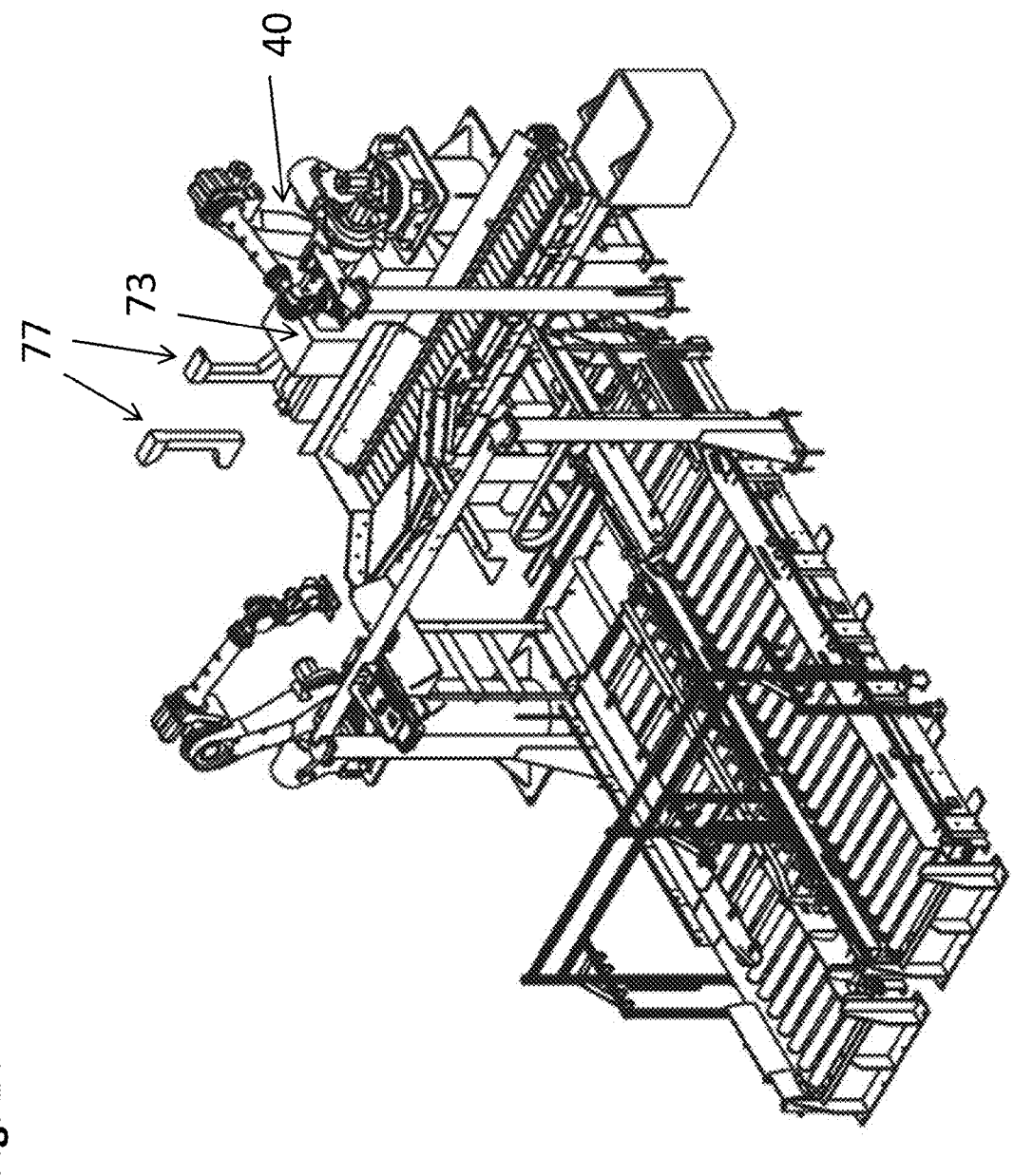
FIG. 14 shows a fifth embodiment of an apparatus in accordance with the invention for the automated removal of workpieces randomly arranged in a container which is based on the embodiment shown in FIG. 4a and which furthermore comprises a measuring device by means of which a measurement of the picking accuracy is possible.
Figure 15:
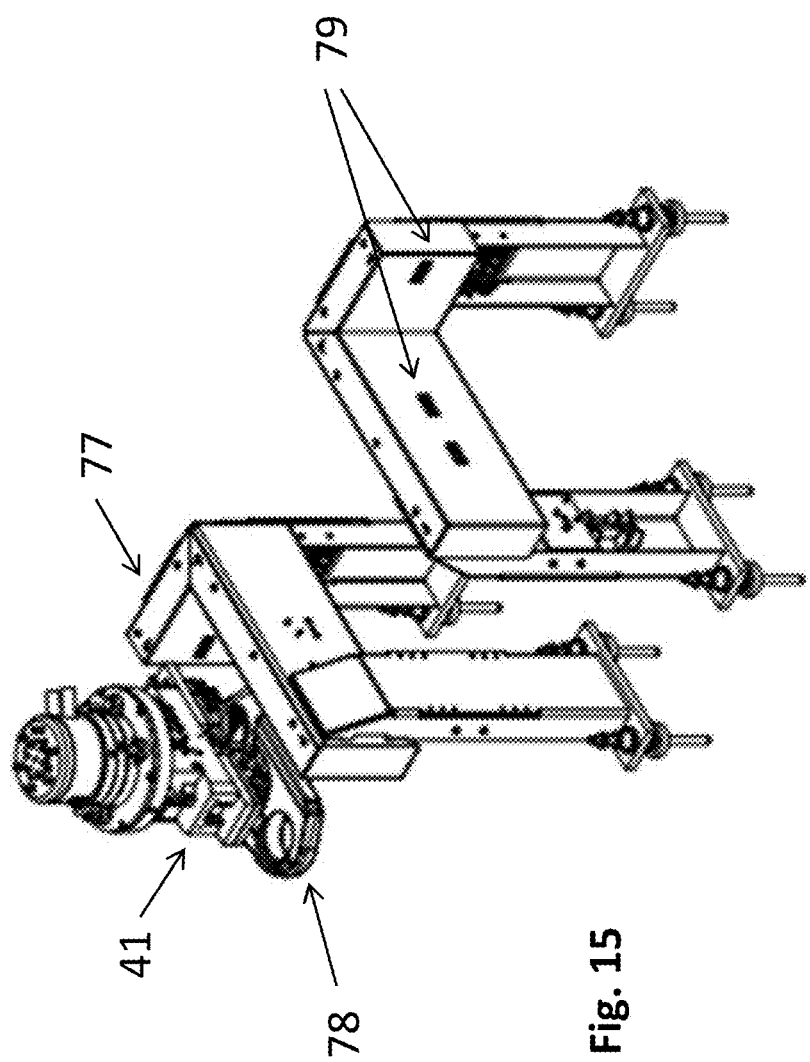
FIG. 15 shows a detailed representation of an embodiment of a measuring device in accordance with the invention in which the picking accuracy can be measured.

In this respect, an embodiment of an apparatus in accordance with the invention is shown in FIGS. 14 and 15 with which the picking accuracy is determined by traveling the gripper with the workpiece toward a separate measuring device 77. For this purpose, the gripper 41 is traveled into a defined position before the measuring device 77 when it has picked a workpiece 78. The measuring device 77 then determines the position of the workpiece 78 and can thus determine the relative position between the workpiece and the gripper from the known position of the gripper and the position of the workpiece. A determination of the picking accuracy or of the position of the workpiece at the gripper is hereby possible.

In the embodiment, the separate measuring device 77 has laser sensors 79 in this respect. In the embodiment, a three-point measurement is carried out in this respect.

A determination of the picking accuracy can in particular be of advantage with mechanical grippers since they admittedly allow a relatively exact picking of the workpieces, but there are also degrees of freedom on picking here. If it is a finger gripper or a jaw gripper, the workpiece can usually be picked in different positions at least with respect to the delivery direction of the gripper to the workpiece. With the finger gripper, this relates to the question how far the fingers engage into a corresponding receiver at the workpiece or how far the fingers engage around the workpiece.

In the embodiment of an apparatus in accordance with the invention shown in FIG. 14 which is based on the embodiment shown in FIG. 4a, the picking accuracy of the gripper 41 which is used for removing the workpieces from the first intermediate station is in this respect determined. Alternatively, however, the picking accuracy on the removal of a workpiece from a second intermediate station could also be determined.

Alternatively to the separate measuring device which is shown in FIGS. 14 and 15 and toward which the gripper can be traveled, a sensor arranged at the gripper itself can also be used for determining the picking accuracy. An embodiment for such a sensor will be described in more detail in the following.

The result of the determination of the picking accuracy can in this respect be used in different manners for controlling the apparatus.

On the one hand, it is possible that a picking error on the placing of the workpiece recognized in this determination is compensated by a corresponding control of the griper or of the gripping arm moving it. This substantially corresponds to a zero point adjustment of the gripper on placing which changed in dependence on a deviation of the workpiece from a desired picking position.

It is furthermore conceivable that poorly picked workpieces are placed down again to be picked again. Such a procedure can in particular be sensible when the picking accuracy lies outside a predefined permitted region.

In this respect, the workpiece can be placed back on the transport belt on the picking from an intermediate station with a transport belt such as is shown in FIG. 4 or 14, for example, when the picking accuracy falls below certain criteria. In an advantageous manner, the workpiece is in this respect placed onto the transport belt in a position from where the workpiece again arrives in the removal region. The workpiece is in this respect advantageously again detected and then again picked using the data determined from this. In this respect, the probability is high that the workpiece can now be picked with sufficient accuracy.

In this respect, a combination of the two procedures is also conceivable. If the accuracy therefore lies outside a permitted region, the workpiece is placed back. Otherwise, the determined deviation from a desired picking position on the placing down of the workpiece is compensated by a corresponding movement.

Figure 16:
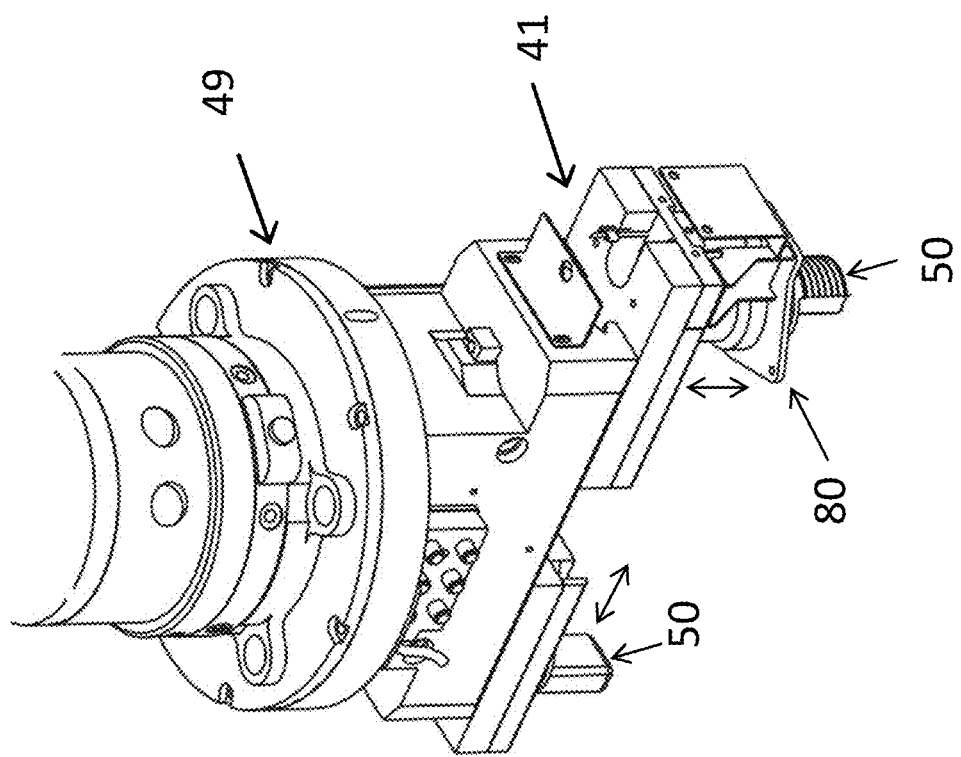
FIG. 16 shows an embodiment of a gripper in accordance with the invention with a stabilizer element.

In FIG. 16, an embodiment of a gripper in accordance with the invention with a stabilizer element is shown. In the embodiment, it is in this respect a mechanical gripper with which the workpiece is picked. To prevent positional changes of the workpiece at the gripper, while the gripper is moved, the stabilizer element 80 is traveled toward the picked workpiece. The stabilizer element 80 has a stabilizer plate at which contact elements are provided for contacting the workpiece. The additional contact points thus provide a positional fixing of the workpiece at the gripper.

In the embodiment the gripper is configured as a two-finger gripper having the two gripping fingers 50 which are introduced into cut-outs of the workpieces for picking The two contact points established by the two gripping fingers 50, however, do not fix the workpiece in a clear position with respect to the gripper so that only the further contact points of the stabilization element establish a defined position of the workpiece at the gripper. The contact points of the stabilizer element are in this respect advantageously arranged remote from line connecting the two gripping fingers 50 in this respect.

In the embodiment, the stabilizer element 80 is arranged in the region of the two gripping fingers and is attached around it. The stabilizer element could, however, also be arranged in any other position at the gripper.

Figure 17:
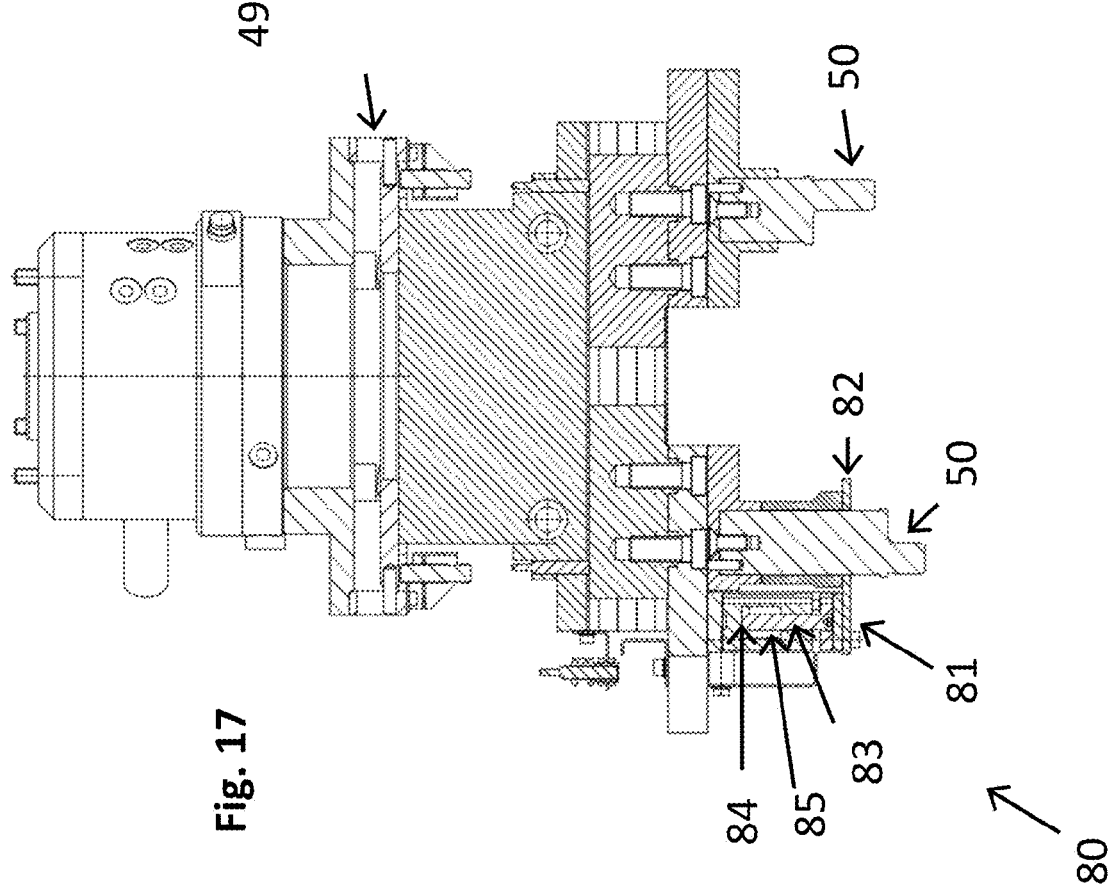
FIG. 17 shows a sectional view through the embodiment of a gripper shown in FIG. 16.

The design of the stabilizer element can again be recognized in the sectional view shown in FIG. 17. In this respect, the stabilizer plate 81 can be recognized at which, for example, contact elements can be arranged in the region 82. The stabilizer plate 81 surrounds the gripping finger 50 in this respect in the form of a ring or of a horse-shoe in the embodiment.

The stabilizer plate 81 is arranged at a cylinder 83 by which it can be traveled to the workpiece. The cylinder 83 is a pneumatic cylinder. The stabilizer element can thus be traveled toward the workpiece when pneumatic pressure is applied at the one side of the cylinder or can be traveled in when pressure is applied to the other side of the cylinder.

The end abutments 84 and 85 of the cylinder 83 are equipped with sensors which recognize whether the stabilizer element is located in one of its end abutment regions. A determination of the picking accuracy is hereby possible since the moving-out distance of the stabilizer element depends on the position of the picked workpiece at the gripper.

If the stabilizer element is in this respect located in the active state in one of its end abutment regions, an insufficient picking accuracy is concluded since the gripper was then either traveled too far into the workpiece or not far enough. A more precise determination of the picking accuracy could naturally also take place by a measurement of the push-out length of the cylinder 83.

Alternatively to the sensor arrangement integrated into the stabilizer element 82 for determining the picking accuracy, a separate sensor would also be conceivable which is arranged at the gripper. For example, in this respect, a laser sensor could be used which is arranged at the gripper to determine the picking accuracy.

In FIG. 17, a compensation unit 49 can also be seen via which the gripper is fastened to a gripping arm.

Figure 19:
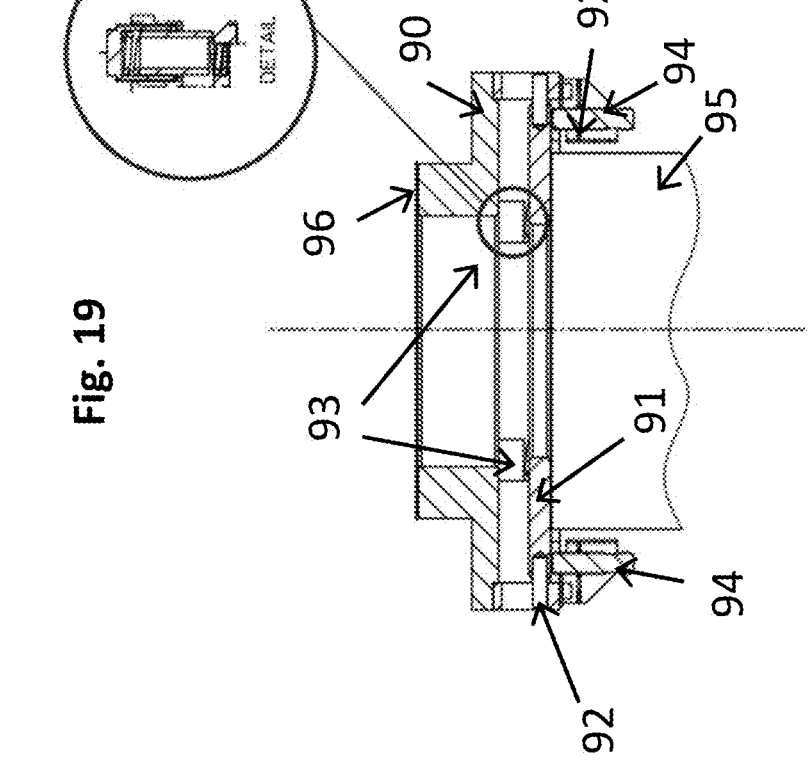
FIG. 19 shows a sectional view through the compensation unit shown in FIG. 18.
Figure 18:
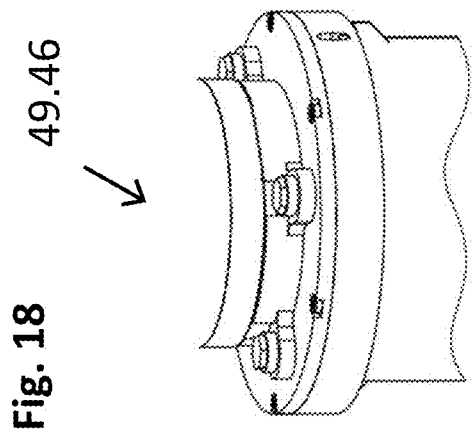
FIG. 18 shows a first embodiment of a compensation unit in accordance with the Invention.

In FIGS. 18 and 19, a first embodiment of such a compensation unit is shown in more detail. In this respect, a base element 90 is provided at which a compensation plate 91 is arranged. The compensation plate 91 is engaged around by holding elements 92 of the base element 90. A spring arrangement 93 which presses the compensation plate 91 toward the holding regions 92 is arranged between the base element 90 and the compensation plate 91. In the embodiment, in this respect, a plurality of coil springs are provided which are arranged in corresponding spring sleeves. However, any desired other embodiments of such a spring arrangement are also conceivable.

The spring force of the spring arrangement is in this respect selected such that the compensation plate 91 is held rigidly at the base unit 90 in normal operation of the gripper. Only in the case of a collision of the gripper or of the workpiece arranged therein with an interfering edge or with another workpiece does the spring arrangement 93 allow a relative movement between the compensation plate 91 and the base element 90. The forces exerted on the gripping arm are hereby limited. It can in particular thus be prevented that the emergency stop of a robot used for moving the gripper or of a surface portal engages.

The force of the spring arrangement 93 can in this respect be set so that the compensation element can be adapted to the corresponding purpose. The setting of the spring force can in this respect in particular take place in that the gripper is moved together with a picked up workpiece into a 90° position to the vertical so that the static load by the gripper and the workpiece on the compensation unit is at a maximum. In this position, the preload of the spring arrangement 93 is set so that no deflection of the compensation unit takes place. It is hereby ensured that no deflection of the compensation unit takes place independently of the orientation of the gripper by the static forces alone which are applied to the compensation unit by the gripper and a picked up workpiece. Optionally, the preload of the spring arrangement 93 can in this respect still be increased by a certain value in order also to take account of dynamic loads, for example on the acceleration of the gripper or of the gripper arm.

The preload of the spring arrangement 93, however, has to be selected so that the compensation unit triggers before the emergency stop of the gripper arm engages.

The first embodiment of a compensation unit in accordance with the invention can in this respect, for example, be used together with a mechanical gripper. The first embodiment of a compensation unit in accordance with the invention can in this respect in particular be used for the second gripper which picks up the workpieces from the intermediate station. Furthermore, the first embodiment of the compensation unit in accordance with the invention can also be used with the third gripper which picks up the workpieces from the second intermediate station.

The first embodiment of the compensation unit in accordance with the invention in this respect has a spherical operation and in particular allows tilt compensation movements. The compensation unit in this respect advantageously allows a maximum compensation angle between 2° and 10°, in particular between 4° and 6°.

In this respect, guide elements are furthermore provided which prevent a rotation of the compensation plate 91 with respect to the base element 90. In the embodiment, guide pins engage for this purpose laterally in corresponding cut-outs of the compensation plate 91.

The compensation plate is in this respect round in the embodiment and has rounded edges to allow a pivot movement around any desired axes.

Contact sensors 94 are furthermore arranged in the region of the holding regions 92. They monitor whether the compensation plate 91 lies on the holding regions or was deflected. Collisions of the gripper can hereby be detected. The sensors 94 in the embodiment are inductive sensors. In the embodiment, in this respect, a plurality of sensors are provided so that information can be obtained on the direction of the deflection of the compensation plate 91. Four sensors are in particular provided in this respect.

The data obtained from the sensors can in this respect be used for controlling the gripper as follows: In normal operation, the compensation unit does not deflect so that the gripper adopts a defined position with respect to the gripping arm which remains unaffected by the compensation unit. On a collision, the compensation unit, however, deflects, which is recognized by the sensors 94.

In this case, the control still allows a certain adjustment path of the gripping arm which is, however, smaller than the compensation path of the compensation unit.

If the movement of the gripping arm, however, exceeds this permitted adjustment path after the recognition of a collision, the picking procedure is stopped and the gripper is traveled back into a zero position. A picking procedure is thereupon started again in that the workpieces are first detected and then a new picking movement is initiated. The compensation unit in this respect protects against an emergency stop of the robot, which could only be cancelled again manually.

Figure 21:
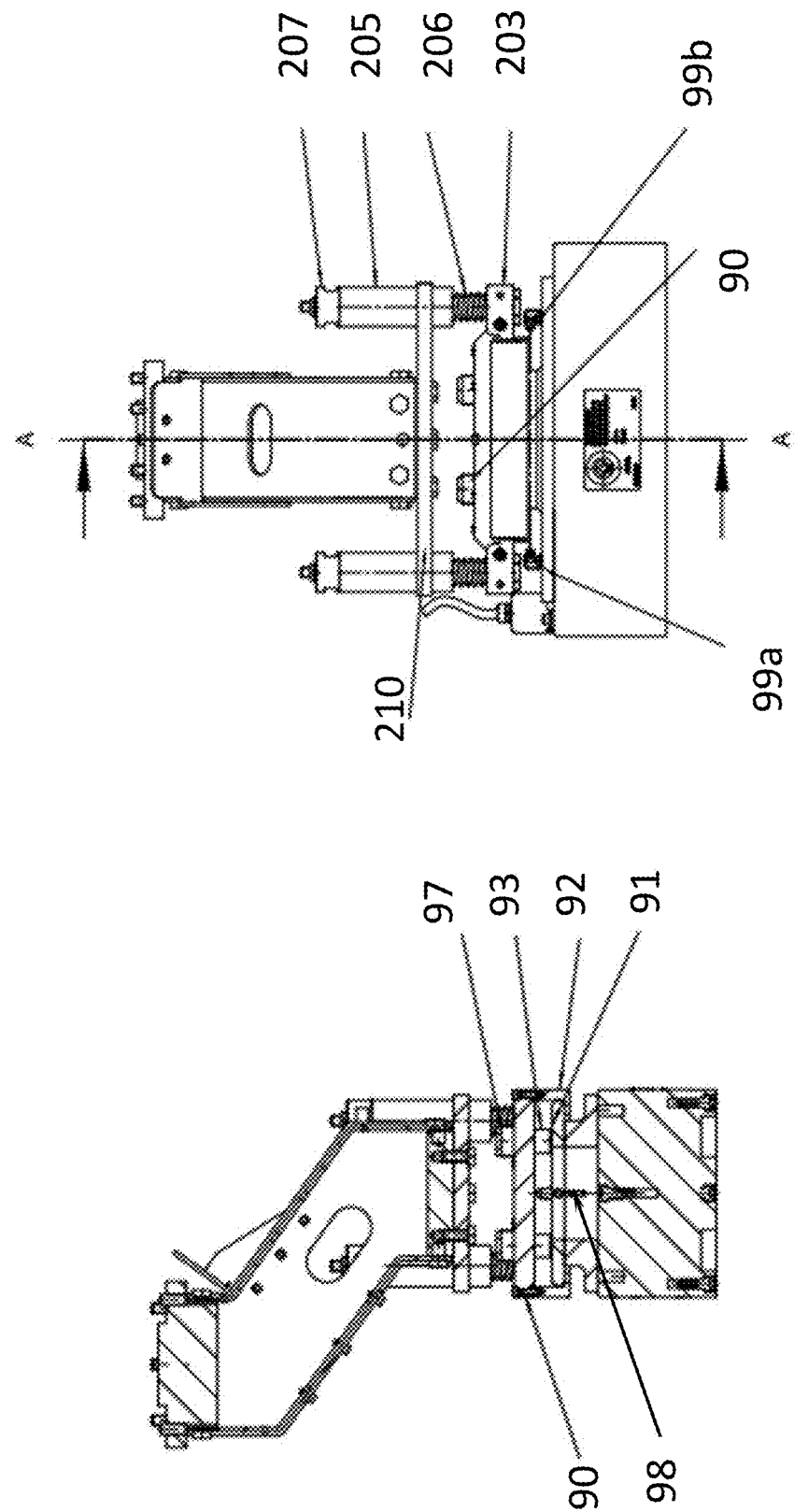
FIG. 21 shows a front view of and a sectional view through the compensation unit shown in FIG. 20.
Figure 22:
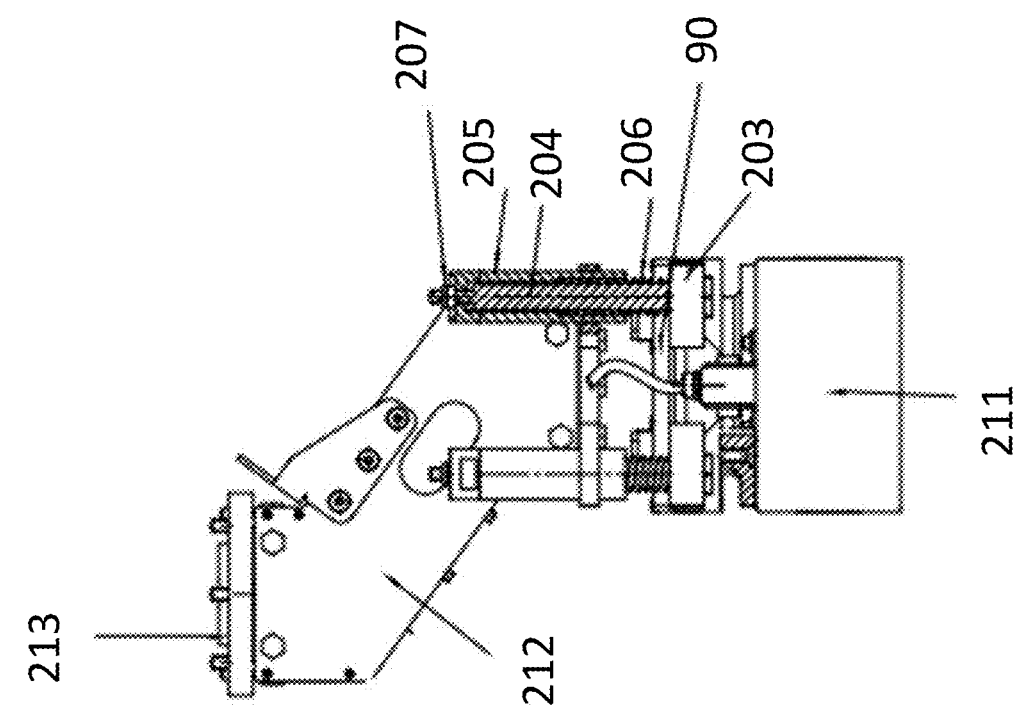
FIG. 22 shows a side view of the compensation unit shown in FIG. 20.

In FIGS. 20 to 22, a second embodiment of a compensation unit in accordance with the invention is shown. This compensation unit combines a compensation unit with a spherical operation as is shown in FIGS. 18 and 19 with a compensation unit with a linear operation in order thus to increase the compensation path.

The total compensation unit 200 in this respect first comprises the spherical compensation part 201 which substantially corresponds in design to the first embodiment of a compensation unit and combines it in series with a second compensation part 202 which has a linear operation.

As can in particular be recognized well in FIG. 21, the spherically operating compensation part 201 has the same mechanical design as the first embodiment of a compensation unit in accordance with the invention, with the same reference numerals also being used for this purpose. In this respect, a base element 90 is in particular provided at which the compensation plate 91 is arranged and is engaged around by holding elements 92 of the base element 90. A spring arrangement 93 which presses the compensation plate 91 toward the holding regions 92 is arranged between the base element 90 and the compensation plate 91. In this respect, adjustment elements 97 are shown via which the preload of the spring arrangement 93 can be changed.

The design of the spherically operating compensation part 201 differs from the first embodiment of a compensation unit in accordance with the invention only with respect to the sensor which is used for detecting a compensation movement. Unlike in the first embodiment, in this respect a light barrier is used having a transmitter 99a and a receiver 99b whose light path runs through a bore 98 through the compensation plate 91. If the compensation plate 91 is deflected in this respect, it interrupts the light path of the light barrier.

The sensor thus recognizes in accordance with the invention the compensation movement of the spherically operating compensation part 201. No sensor is in contrast provided for the linearly operating compensation part 202.

The linearly operating compensation part 202 is in this respect arranged between the base element 90 and the gripping arm. In this respect, fastening regions 203 at which bars 204 are arranged are provided in the corner regions of the base element 90. The bars 204 are guided in a linearly displaceable manner in guides 205 which are arranged at a plate 210. The plate 210 is then in turn connected to the end of the gripping arm. The movement of the bars 204 in the guides 205 takes place against the preload of a spring arrangement 206 which can be set via adjustment elements 207.

The two-stage compensation unit in accordance with the present invention is combined in the embodiment with a magnetic gripper 211 and can be coupled via a cropped gripping arm extension 212 to a gripping arm, in particular to a robot arm. For this purpose, the gripping arm extension 212 has a coupling surface 213 with which it can be coupled to the last pivot joint of a robot arm.

The two compensation parts 201 and 202 of the compensation unit are configured in this respect such that the spherically operating compensation unit 201 deflects first and only then the linearly operating compensation unit 202. The linearly working compensation unit 202 can in this respect have a compensation path between 1.5 and 5 cm, preferably between 2 and 3 cm. This compensation path allows the movement of the gripper to be braked in good time in the event of a collision before the total compensation path of the compensation unit has been utilized.

The preload of the spring units of the second embodiment of a compensation unit could be set in the same manner as the spring load in the first embodiment of a compensation element in accordance with the invention. In this respect, the preload of the spring unit 93 could in particular be set so that it also takes up the static loads from the griper and a workpiece hung on with a gripper pivoted to the side by 90° without deflecting the compensation unit. The preload of the spring unit 206 of the linear part of the compensation unit were then be set correspondingly greater. In this respect, however, it must be taken into account that the preloads of the two parts of the compensation unit have to be set so that the compensation units still deflect beneath the maximum load limit of the robot arm. This is in particular difficult to realize with very heavy grippers or very heavy workpieces in which the static load already lies close to the maximum load of the gripping arm.

Alternatively, the preload of the spherical part of the compensation unit can therefore be set such that it only takes up the static load by the magnetic gripper when it is located in a position directed 90° to the side, but already deflects with a workpiece hung on in this position.

The present invention in this respect makes use of the fact that the gripper with the picked up workpiece can be moved immediately after the picking up into a travel position in which the gripping surface faces downward so that the static loads by the gripper and the workpiece are taken up by the compensation unit without it being deflected. A slanted orientation of the gripper is, in contrast, only necessary on the traveling toward the workpiece to bring the gripping surface of the gripper into coverage with the main surface or with the engagement points of the workpiece.

In this respect, the gripper advantageously travels perpendicular to the gripping surface toward the workpiece, picks it and is then traveled back in the opposite direction again together with the workpiece. In this respect, the signal of the sensor of the compensation unit is not considered for a certain path distance on the moving back in order not to evaluate a deflection of the compensation unit solely due to the static load by the workpiece hung on and/or due to dynamic loads due to the traveling of the gripping arm erroneously as a collision. During this path distance, the gripper is simultaneously traveled into a travel position in which the gripping surface and thus the tool face vertically downwardly and thus do not act against the spring elements of the compensation unit.

If the gripper is moved back by a certain distance and if it was pivoted in the travel position, the signal of the sensor of the compensation unit is again used to detect collisions of the gripper or of the workpiece with interference edges.

On the traveling of the gripper toward a workpiece, the signal of the sensor of the compensation unit can moreover be utilized to detect the contact of the gripper with the workpiece. The gripper is in this respect traveled slowly to the workpiece until the compensation unit deflects.

Independently of the exact embodiment of the compensation unit, in this respect in accordance with the present invention, work can be carried out with different travel speeds for the gripping arm depending on the region in which the gripper is located. The gripping arm can in this respect be moved in fast motion, i.e. at a high speed, in a region in which the gripper is located outside the container and thus no collision with interfering edges is to be feared. If the gripper is, in contrast, located in the region of the container so that collisions have to be anticipated, it preferably works at a second, lower speed. The speed is in this respect selected so that the gripper can be stopped on a collision with an interference edge before the compensation path of the compensation unit is completely used up and the compensation unit does not permit any further compensation movement. In the near region to the workpiece to be picked up, the gripper is furthermore preferably traveled at a third, even lower speed. This still allows a certain travel path of the gripper or gripping arm on the detection of a collision before its movement has to be stopped.

Embodiments of the methods in accordance with the present invention will now be presented in more detail again with reference to flowcharts. They can preferably be carried out using apparatus such as were described above.

Figure 23:
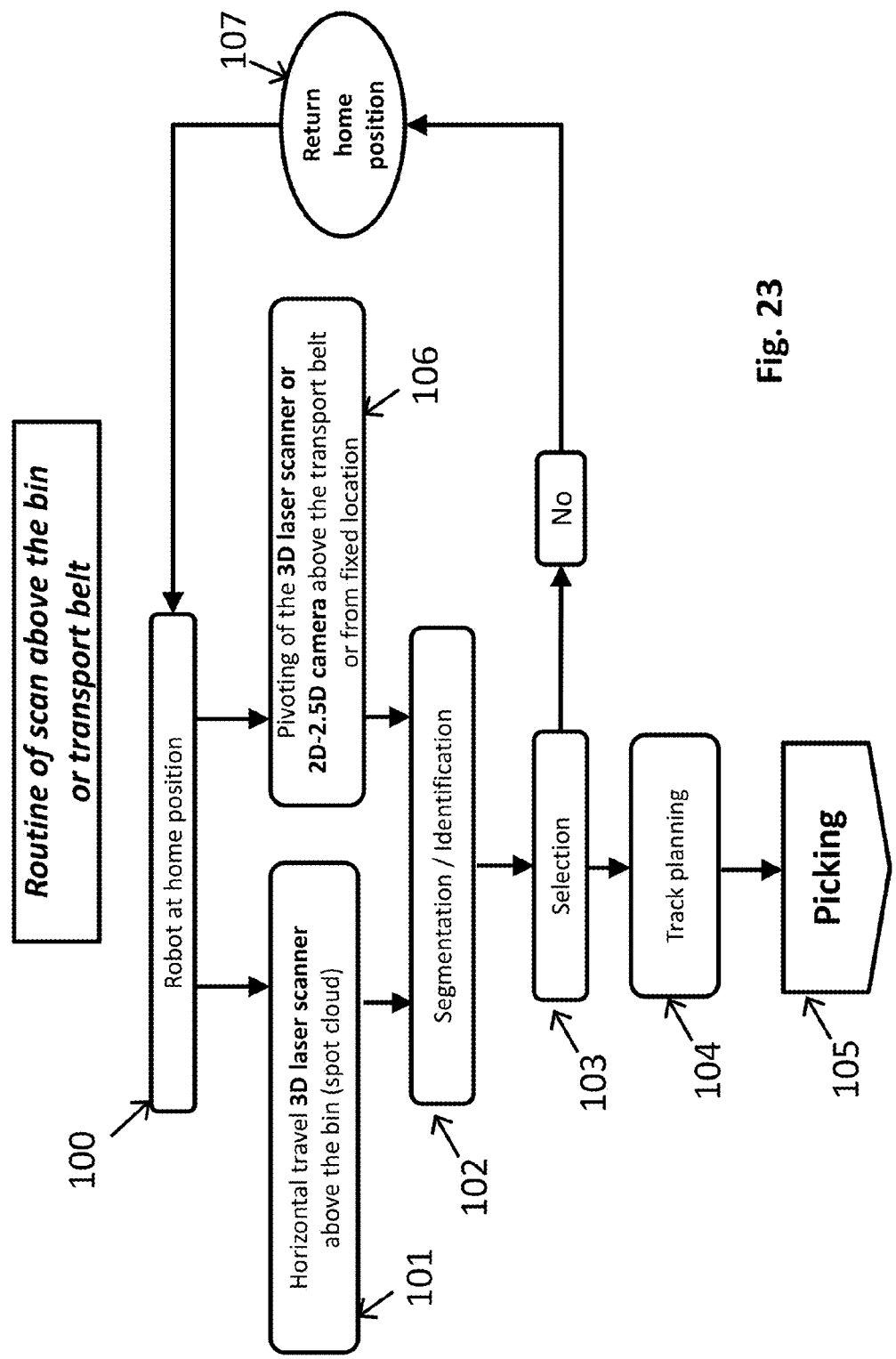
FIG. 23 shows a flowchart of a method for detecting workpieces in accordance with the present invention.

FIG. 23 in this respect shows the routine of the detection of the workpieces in an embodiment of the present invention, and indeed both for the case that workpieces randomly arranged in a container are detected and workpieces randomly arranged on an intermediate station are detected.

In step 100, the system is located in a starting state. The gripper for picking the workpieces can in particular be arranged outside the detection region in this starting state. The gripper can for this purpose either be set down in a parking position or can carry out actions in a region outside the detection region such as, for example, placing down an already picked workpiece.

In step 101 or 106, a measurement now takes place by the sensors of the object recognition device. For this purpose, in particular a 3D laser scanner can be used in the embodiment. With the 3D laser scanner used in the embodiment for detecting the workpieces in the container, the 3D laser scanner is first traveled into a measuring position above the container from where the scanner is pivoted over the detection region. Alternatively, a detection during the horizontal travel movement of the 3D laser scanner would also be possible. On the detection of the workpieces on the intermediate station in accordance with step 106, the sensor is, in contrast, fixedly installed, with it being pivoted by pivoting over the detection region.

Alternatively to the use of a 3D laser scanner, a camera system or a combination of a camera system and a laser scanner could also be used. A 2D or 2.5D detection by means of a camera can in particular also be considered in this respect.

In step 102, the data are now evaluated and the workpieces identified.

The identified workpieces are evaluated with regard to their positions toward one another. It is in particular determined in this respect which workpieces lie highest and which workpieces are at least partly covered by other workpieces. A selection is hereby prepared for the decision which part is suitable for picking In step 103, a decision is now made as to which part is to be picked in the next step. If this is not possible using the existing data, a detection can be carried out again in a new cycle, for which purpose the system moves back into the starting state in step 107.

If, in contrast, a workpiece was selected, a track planning for the gripper takes place in step 104. The determined parameters of the part to be picked which describe the position and spatial arrangement of the part are used as the basis for the track planning The system in this respect knows its current location and the target coordinates. The path, the so-called track, can then be calculated with the aid of the determined spatial data.

In this respect, a collision identification also advantageously takes place in which the gripper and the container are represented by geometrical data and the planned track is simulated in order thus to determine possible collisions in advance and to preclude them in the track planning by determining an alternative path.

In step 105, the controlling of the gripper and the picking of a workpiece take place using the data thus calculated.

Figure 24:
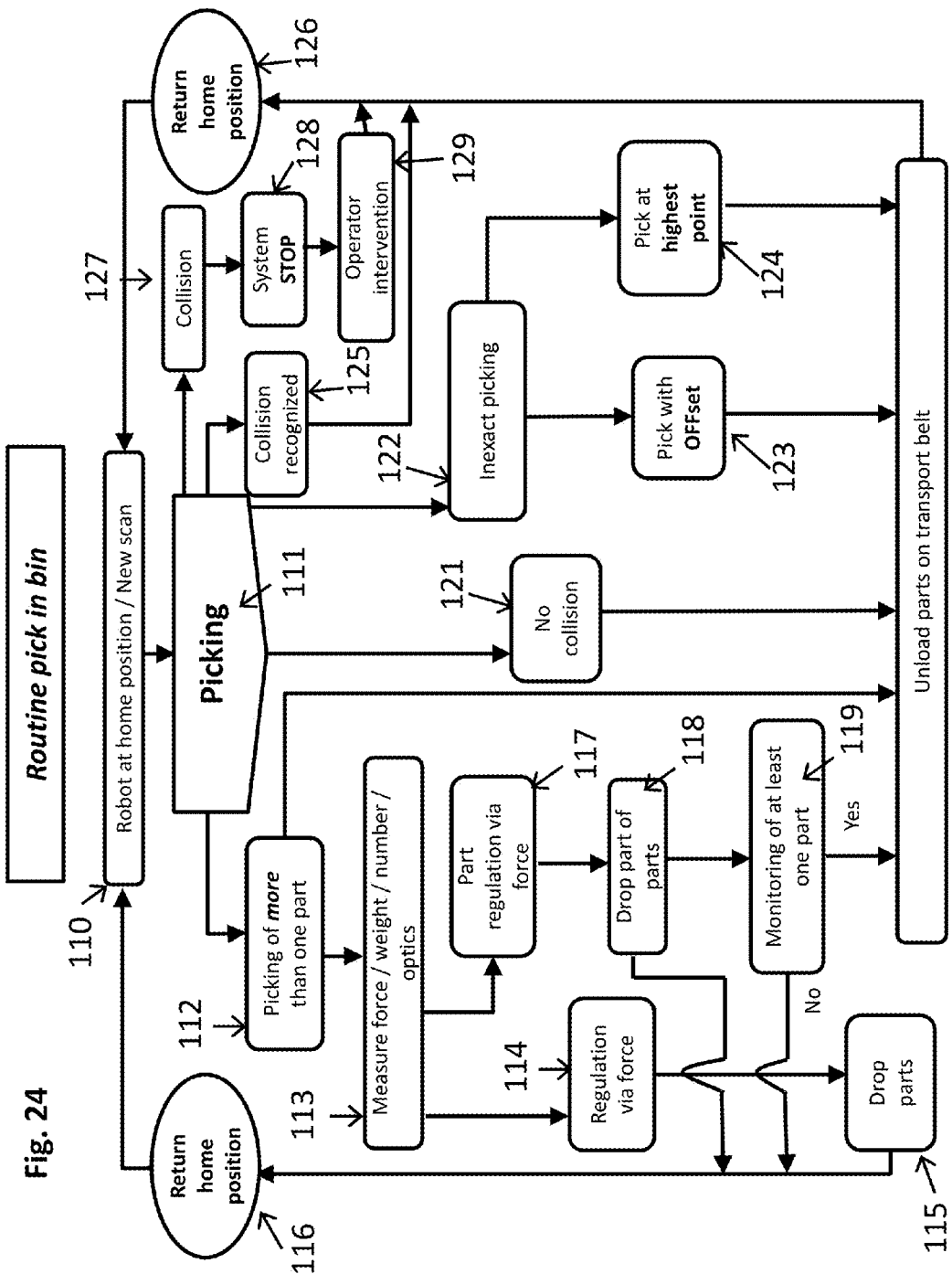
FIG. 24 shows a flowchart of a method for the picking in accordance with the invention of workpieces from a container.
Figure 25:
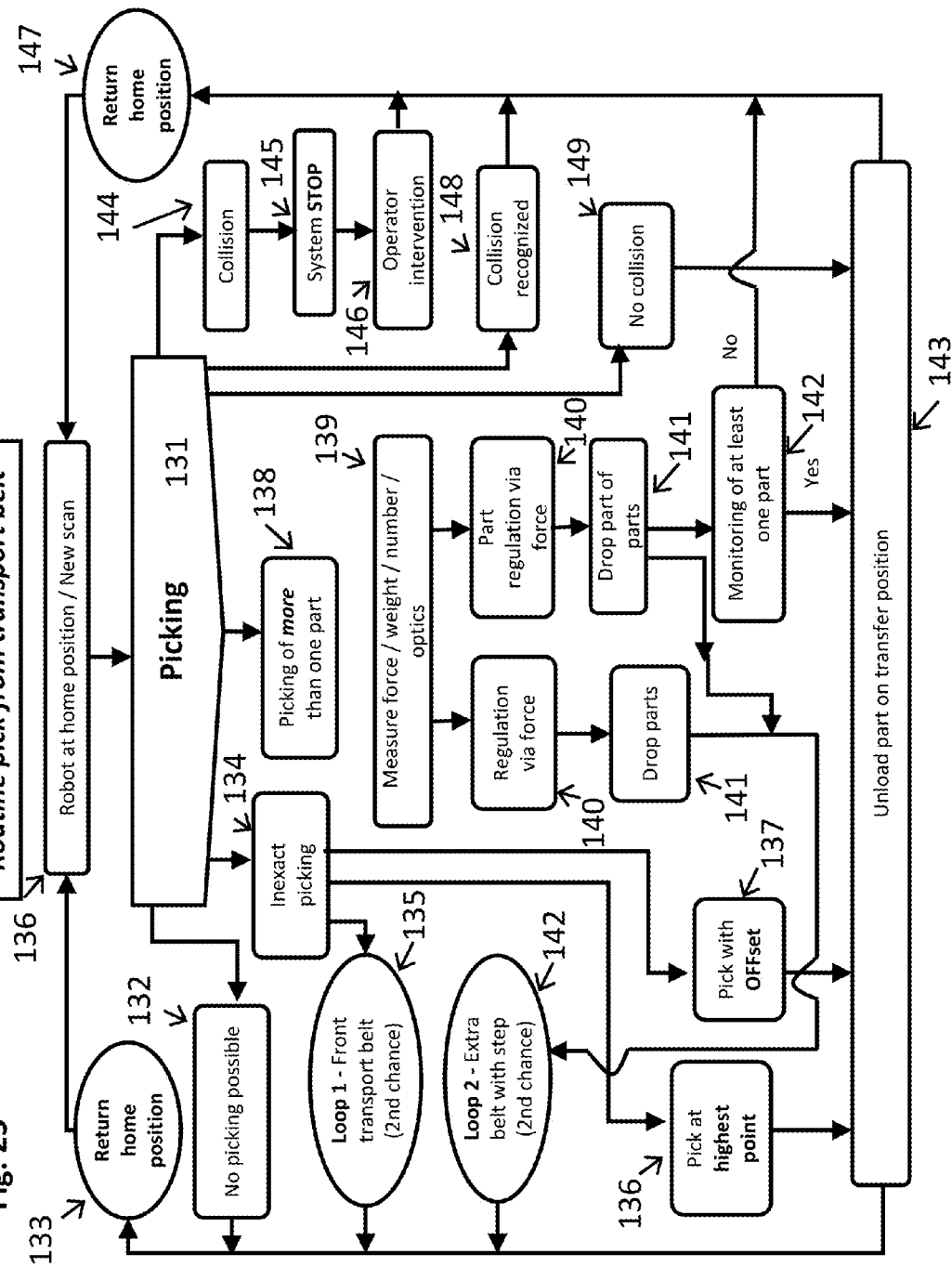
FIG. 25 shows a flowchart of a method for the picking in accordance with the invention of workpieces from an intermediate station.

Before now the different picking strategies in accordance with the invention are shown next to one another with reference to FIGS. 24 and 25, the possibilities for the design of an apparatus in accordance with the invention should be shown again in overview by which the corresponding strategies can be implemented.

An apparatus in accordance with the present invention can comprise two grippers. A first gripper is used to roughly pick the parts from the bin. A second gripper is provided for the precise picking and singularization on an intermediate station which can in particular be equipped with a transport belt. The second gripper places the workpieces on a further intermediate station or on a target receiver for a measurement treatment or work treatment of the workpieces. Which type of gripper is use depends on the geometry, the design, the size and/or the weight of the workpieces to be picked and/or on the number of gripping zones and on the geometry and the design of the gripping zone.

The workpieces can, however, possibly catch with one another, lie above one another or also remain stuck. They can have gripping zones which are not sufficient for a direct picking from the bin since they are not sufficiently accessible in certain positions which they can adopt with a plurality of parts in the bin. If the parts in this respect possibly only have a specific gripping zone, a targeted, direct picking with a mechanical gripper proves not to be sufficiently reliable and is moreover slow and prone to problems.

In a preferred case, the first gripper is therefore a magnetic gripper and the second gripper is a mechanical gripper.

The use of a magnetic gripper for the pick in the bin or the container has the advantage that no exact picking in a precise gripping zone is required. Furthermore, with a magnetic gripper, a picking at different gripping points of a workpiece is usually possible. A picking at the highest point of the workpiece is also in particular usually possible. Furthermore, with a magnetic gripper, a simultaneous picking of a plurality of parts is possible to place them on the intermediate station. In accordance with the invention, a fast and one hundred percent emptying of the bin is thus possible by the use of a magnetic gripper.

A mechanical gripper has the advantage that the part can be picked precisely in a gripping zone so that the workpiece can subsequently be placed individually in a defined position on or in a receiving station. The receiving station can in this respect be the receiving station of a further intermediate station or the target receiver of a measurement station or processing station. The workpiece can equally be placed on an intermediate station which serves as a buffer station or as a demagnetization station or measurement station.

The preferred case of a combination of a magnetic first gripper and a mechanical second gripper is in particular used with workpieces having a position-orientated gripping zone and/or an asymmetrical, symmetrical or rotationally symmetrical contour with a corresponding size and weight. A magnetic gripper can in this respect naturally only be used when the workpiece can be picked by a magnetic gripper, that is comprises metal, for example.

In this respect, the magnetic gripper places the workpieces on an intermediate station, where they are detected again so that they can now be picked directly by the mechanical gripper and can then be placed onto a processing station, measurement device or a transport belt.

The following further combinations for the configuration of the first and second grippers are likewise conceivable: mechanical/mechanical, pneumatic/mechanical, mechanical/pneumatic, pneumatic/pneumatic and magnetic/pneumatic. Any desired other combinations of mechanical and/or pneumatic and/or magnetic grippers are also conceivable.

The grippers can in this respect each be moved either by a robot arm or a linear portal or a surface portal. Optionally, the respective grippers can be combined with a compensation unit and/or with a force torque sensor depending on which strategies are to be used in picking The compensation unit in this respect improves the system security in that it prevents the necessity of an operator intervention on collisions.

The intermediate station has a transport belt which transports the workpieces from the placing region into a removal region. In this respect, the placed down parts are conveyed via a workpiece slide to the transport belt. So that the parts placed down by the magnetic gripper come to lie as ideally as possible on the transport belt, the transport belt is bounded by slanted metal sheets which allow workpieces sliding onto the margin of the transport belt to slide back onto the belt. At the same time, a flap which can be moved by the workpieces, in particular a pivotable metal sheet or a transverse bar, can be installed above the transport belt so that parts lying above one another can still be singularized or parts not positioned correctly tilt over. The workpieces can hereby be better detected by the scanner or camera and can be picked better.

A design with only one gripper which picks first in the container, places the workpiece on an intermediate station and then picks the workpiece again for singularization would be alternatively conceivable. The first gripper would thus also be used for removing the workpiece from the intermediate station and for placing it on a further intermediate station or the target receiver.

The invention in this respect comprises the following methods which can in particular be carried out in the operation of an apparatus in accordance with the invention: Sorting out workpieces:

If the first gripper is combined with a force tongue sensor, a selection can already be carried out at this point by weight of the workpieces. Workpieces which lie outside a specific limit with respect to weight can in particular be sorted out. They can in particular be sorted out into a sorting out container.

A sorting out by the first gripper is also possible in that workpieces which are recognized as lying outside a predefined specification on detection are picked up and are placed in a sorting out container instead of on the intermediate station.

Workpieces which are detected on the intermediate station and which lie outside a predefined specification can be sorted out. This can in particular take place by a further transport of such workpieces into a sorting out container at the end of the transport belt.

It is equally conceivable to hold a just picked part at a measurement device where e.g. geometries, surfaces (for example a lacquering) and/or markings (e.g. by codes) can be measured and/or inspected. If this measurement indicates that a part lies within a predefined specification, the picked part is placed down normally, e.g. on the intermediate station or on a target receiver. If it is outside the specification, it is sorted out.

Prevention of system stops:

A system stop can be prevented by picking with an offset at which the gripper slightly misses the ideal picking position. In this case, the gripper travels back around 25 mm and starts to travel again in order to pick more precisely this time.

Furthermore, it can be recognized via a force torque sensor when too many parts were picked at once. In particular when hereby the maximum load of the robot could be exceeded, the load can be reduced by a dropping of the workpieces back into the container. The parts remaining at the gripper can then be unloaded at the intermediate station.

If the situation arises at the intermediate station that the object recognition device cannot detect the part exactly since the parts e.g. lie above one another and cannot be detected exactly or that a picking is not possible or only takes place with insufficient accuracy, the following strategies can be used:

On the one hand, a further, lower-lying transport belt can be used on which the parts not picked travel on in order thus to adopt the required position by falling over a stage. The workpiece thus has a second chance and is again supplied to the transport belt for precise picking (Loop 2). In this respect, e.g. with smaller parts which can catch with one another, provision can also be made that the transport path guided as a circuit has singularization devices which pulls the parts apart and hereby singularizes them. For this purpose, sheet metals or transverse bars can, for example, be used which narrow the transport belt and/or brush the workpieces.

If the parts are admittedly picked, but no exact picking takes place, this can be registered via a sensor. For this purpose, for example, a pneumatic cylinder can be provided at the mechanical gripper. This not only recognizes the gripping position within a necessary limit for a subsequently precise placing of the parts, but also has the consequence of a stabilization of the part in picking On a recognized inexact picking, the second gripper can place the workpiece back onto a front part of the transport belt of the intermediate station. The part thus also has a second chance for exact picking (Loop 1).

On picking a workpiece from a container, the above-named strategies can in particular be combined to form the routine shown in FIG. 24:

In this respect, the system is in a base state in step 110 in which the track calculated by the track planning is predefined for the gripper. In step 111, the attempt of picking then takes place using the calculated track planning If in step 112 more than one workpiece is picked, the further procedure depends on whether this can be recognized by a sensor. If this is not the case, the workpieces are simply unloaded onto the transport belt. Otherwise it is possible to carry out a measurement with respect to force, weight, number or optics in step 113. A force torque sensor can in particular be used in this respect. Alternatively, a 3D laser or a 2D camera or a 2.5D camera can also be used here. A decision now takes place by recognizing predefined limits whether too many parts were picked up. If too many parts were picked up, a falling of all parts back into the bin can take place either in step 114 by a switching off or reducing of the gripping force of the gripper. After this step 115, a completely new picking procedure takes place, including detection of the parts. Alternatively, in step 117, a part regulation can take place by partial reduction of the force of the gripper and thus partial dropping of the workpieces back into the bin. In step 119, a check can again be made whether at least one part is hanging on. If such a part is hanging on, this can be unloaded on the intermediate station in step 120. If no part is hanging on, a new picking cycle can be started directly.

If, in contrast, it is recognized in the measurement that only one part is hanging on, this can be unloaded directly. If it is recognized in the measurement that no part at all was picked up, a new picking cycle can start immediately.

It is shown in step 122 how it is possible to proceed if a centered picking is not possible. In this case, the gripper either searches for the highest point of the selected part and grips at this point again in step 124 or it picks with an offset in step 123, i.e. it travels back by about 25 mm from the part and then travels toward the part again.

Alternatively, such a decision can already take place when it is recognized in the selection of the workpiece to be picked that none of the parts is centered in a pickable manner. In this case, a picking can already be planned in the track planning with an offset at which the gripping surface and the main surface of the workpiece do not fully overlap or a picking at the highest point can be planned.

The system can deal with collisions as follows in this respect: If no collision occurs, as in step 121, the workpieces can thus be unloaded on the intermediate station. If, in contrast, in step 125, a collision is recognized, for example, by a force torque sensor and/or a compensation unit, the control still allows a defined travel path. If this is also exceeded, the picking procedure is stopped and the system starts a new picking cycle. If, in contrast, the collision in step 127 is only recognized by the emergency stop function of the robot, this results in a system stop in step 128 which can only be cancelled again by an operator intervention 129.

On the picking of a workpiece from the intermediate station, and in particular from the transport belt of the intermediate station, the strategies in accordance with the invention can in particular be combined to form the routine shown in FIG. 25:

First, in steps 130, a workpiece travels on the transport belt into the recognition region of the object recognition device and the transport belt stops. Then the recognition is carried out, in particular a scanning by a 3D laser scanner. It can be pivotable or travelable in a vertical or horizontal manner or can be arranged at a fixed position above the transport belt. Alternatively, a taking of an image can take place via a 2D, 2.5D or 3D camera. After the evaluation of the data and the corresponding determination of a track for the gripper, as was already previously described, the picking then takes place in step 131.

The picking of more than one part in step 138 can trigger the same procedure as in the picking from a container. If in this respect a mechanical gripper is used, only the possibility remains, however, of dropping all parts in steps 140 and 141.

The procedure in the event of a collision in steps 148 or 144 is also identical to the procedure on picking from a container.

On an inexact picking in step 143, a procedure can likewise be following as was presented with respect to the corresponding steps in FIG. 23. These strategies can in particular be used when a magnetic gripper is used as the second gripper.

Furthermore, when the picking accuracy in step 134 is no longer sufficient, the part can again be placed onto the front part of the transport belt (Loop 1) so that the workpiece can again be detected and picked.

If no recognition is possible or if no workpiece can be picked, the workpiece can again be conveyed over a return path onto the transport belt in a corresponding embodiment of the intermediate station so that a repeat chance for picking is given (Loop 2). Otherwise the workpiece which cannot be picked has to be traveled into a sorting out container.

The present invention makes possible a handling of the workpieces with fast cycle times, small error rates and a great accuracy in picking with the above-presented apparatus and methods. In this respect, a high process security results by the avoidance of system downtimes which would require operator intervention. Furthermore, the present invention allows a 100 percent emptying of the containers.

The invention claimed is:

1. An apparatus for automated removal of workpieces arranged in a container, comprising a first object recognition device for detecting the workpieces and a first gripper for picking and removing the workpieces from the container;
- a control for evaluating data of the first object recognition device, for path planning and for controlling the first gripper,
- wherein an intermediate station comprises a placing region and a removal region, different than the placing region, wherein the first gripper places the workpieces on the placing region of the intermediate station after the removal from the container, wherein the apparatus positions the workpieces more accurately and/or singularizes the workpieces by picking the workpieces up from the removal region of the intermediate station; and
- a second object recognition device for detecting the workpieces on the intermediate station, wherein the second object recognition device is arranged in the removal region of the intermediate station.

2. The apparatus in accordance with claim 1, wherein the first gripper for picking the workpieces in the container is a magnetic and/or pneumatic gripper.

3. The apparatus in accordance with claim 1, wherein, for the event that the first gripper cannot pick up a workpiece with a first position calculated for picking, the first gripper repeats the picking with at least one second, changed position; and/or wherein, for the event that no workpiece can be picked with a predefined ideal picking position between the workpiece and the first gripper, the control makes use of a second gripping position.

4. The apparatus in accordance with claim 1, wherein the apparatus uses the first gripper for picking up the workpieces from the removal region of the intermediate station.

5. The apparatus in accordance with claim 1, wherein the control controls the first gripper for placing the workpieces on the intermediate station such that it drops the workpieces onto the placing region of the intermediate station from a certain height, wherein movement of the first gripper is controlled by a height sensor for measuring a height of the workpiece gripped by the first gripper over the placing region.

6. The apparatus in accordance with claim 5, wherein the placing region of the intermediate station comprises a slanted plane, such that the workpieces move out of the placing region by gravity.

7. The apparatus in accordance with claim 1, wherein the intermediate station comprises a transport belt for transport of the workpieces from the placing region to the removal region, where they are gripped and removed from the intermediate station.

8. The apparatus in accordance with claim 7, wherein the transport belt is equipped with a mechanical reorientation device which at least partly changes a position of workpieces on the transport belt on their way from the placing region to the removal region.

9. The apparatus in accordance with claim 8, wherein the reorientation device has a flap and/or a bar which extends transversely to a transport direction over the transport belt.

10. The apparatus in accordance with claim 1, wherein the first gripper for picking the workpieces in the container is a mechanical gripper.

11. The apparatus in accordance with claim 1, wherein the first gripper is moved by a gripping arm, wherein the gripping arm is a robot arm of a 6-axial robot or a gripper arm arranged at a surface portal or at a linear portal.

12. The apparatus in accordance with claim 1, wherein the apparatus comprises a second gripper for picking up the workpieces from the removal region of the intermediate station.

13. The apparatus in accordance with claim 1, wherein the first gripper is used for picking up the workpieces from the removal region of the intermediate station.

14. An apparatus for automated removal of workpieces arranged in a container, comprising a first object recognition device for detecting the workpieces and a first gripper for picking and removing the workpieces from the container; and
- a control for evaluating data of the first object recognition device, for path planning and for controlling the first gripper,
- wherein an intermediate station comprises a placing region and a removal region, different than the placing region, wherein the first gripper places the workpieces on the placing region of the intermediate station after the removal from the container, wherein the apparatus positions the workpieces more accurately and/or singularizes the workpieces by picking the workpieces up from the removal region of the intermediate station,
- wherein the control controls the first gripper for placing the workpieces on the intermediate station such that it drops the workpieces onto the placing region of the intermediate station from a certain height, wherein movement of the first gripper is controlled by a height sensor for measuring a height of the workpiece gripped by the first gripper over the placing region, and
- wherein the height sensor is a light barrier arrangement arranged laterally at the placing region.

15. The apparatus in accordance with claim 14, further comprising a slanted plane and a transport belt arranged on the intermediate station such that workpieces placed by the first gripper on the slanted plane move to the transport belt by gravity and are further transported by the transport belt to the removal region, where they are gripped and removed from the intermediate station.

16. An apparatus for automated removal of workpieces arranged in a container, comprising a first object recognition device for detecting the workpieces and a first gripper for picking and removing the workpieces from the container; and
- a control for evaluating data of the first object recognition device, for path planning and for controlling the first gripper,
- wherein an intermediate station comprises a placing region and a removal region, different than the placing region, wherein the first gripper places the workpieces on the placing region of the intermediate station after the removal from the container, wherein the apparatus positions the workpieces more accurately and/or singularizes the workpieces by picking the workpieces up from the removal region of the intermediate station, and
- wherein the apparatus comprises a second gripper for picking up the workpieces from the removal region of the intermediate station.

17. The apparatus in accordance with claim 16, wherein the first gripper and/or the second gripper is/are moved by a gripping arm, wherein the gripping arm is a robot arm of a 6-axial robot or a gripper arm arranged at a surface portal or at a linear portal.

18. The apparatus in accordance with claim 16, wherein the intermediate station comprises a transport belt for transport of the workpieces from the placing region to the removal region, where they are gripped and removed from the intermediate station.

19. An apparatus for automated removal of workpieces arranged in a container, comprising a first object recognition device for detecting the workpieces and a first gripper for picking and removing the workpieces from the container; and
- a control for evaluating data of the first object recognition device, for path planning and for controlling the first gripper,
- wherein an intermediate station comprises a placing region and a removal region, different than the placing region, wherein the first gripper places the workpieces on the placing region of the intermediate station after the removal from the container, wherein the apparatus positions the workpieces more accurately and/or singularizes the workpieces by picking the workpieces up from the removal region of the intermediate station,
- wherein the intermediate station comprises a transport belt for transport of the workpieces from the placing region to the removal region, where they are gripped and removed from the intermediate station, and
- wherein detection of the workpieces and/or removal of the workpieces from the removal region takes place on and from the transport belt.

20. The apparatus in accordance with claim 19, wherein the intermediate station comprises an occupation sensor different from the first object recognition device to detect a state where an occupation of the placing region and/or of the transport belt and/or of the removal region with workpieces is too high.

21. The apparatus in accordance with claim 20, wherein the occupation sensor comprises a light barrier arranged laterally at the placing region and/or at the transport belt and/or at the removal region.

22. The apparatus in accordance with claim 20, wherein the placing of workpieces on the intermediate station is stopped when the occupation sensor recognizes too high an occupation.

23. A method for automated removal of workpieces arranged in a container comprising the steps of:
- detecting the workpieces in the container;
- picking at least one workpiece from the container using a first gripper,
- removing the at least one workpiece from the container,
- wherein after the removal from the container, the workpieces are placed onto a placing region of an intermediate station, wherein the workpieces move on the intermediate station to a removal region, from where the workpieces are picked up and positioned more accurately and/or are singularized, wherein the removal region is different than the placing region, wherein the workpieces move on the intermediate station to the removal region via a transport belt of the intermediate station, and further comprising while workpieces are moving on the transport belt from the placing region to the removal region, changing a position of at least some of the workpieces on the transport belt via a mechanical reorientation device.

24. An apparatus for automated removal of workpieces arranged in a container, comprising:
- a first object recognition device for detecting the workpieces in the container;
- a first gripper arranged on a first gripping arm of a first 6-axial robot, for picking and removing the workpieces from the container;
- a control for evaluating data of the first object recognition device, for path planning and for controlling the first gripper,
- an intermediate station comprising a placing region, a removal region, different than the placing region, and a transport belt for transport of the workpieces from the placing region to the removal region, wherein the first gripper places the workpieces on the placing region of the intermediate station after the removal from the container,
- a second gripper arranged on a second gripping arm of a second 6-axial robot for picking up the workpieces from the removal region of the intermediate station, wherein the second gripper positions the workpieces more accurately and/or singularizes the workpieces by picking the workpieces up from the removal region of the intermediate station, and
- a second object recognition device for detecting the workpieces on the intermediate station, wherein the second object recognition device is arranged above the transport belt,
- wherein detection of the workpieces by the second object recognition device takes place on the transport belt and removal of the workpieces from the removal region by the second gripper takes place from the transport belt.

25. The apparatus in accordance with claim 24, wherein the first gripper for picking the workpieces in the container is a magnetic gripper.

* * * * *